United States Patent
Katsavounidis

(10) Patent No.: US 12,255,940 B2
(45) Date of Patent: Mar. 18, 2025

(54) ENCODING TECHNIQUES FOR OPTIMIZING DISTORTION AND BITRATE

(71) Applicant: NETFLIX, INC., Los Gatos, CA (US)

(72) Inventor: Ioannis Katsavounidis, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/053,754

(22) Filed: Aug. 2, 2018

(65) Prior Publication Data
US 2019/0028529 A1    Jan. 24, 2019

Related U.S. Application Data

(63) Continuation-in-part of application No. 16/034,303, filed on Jul. 12, 2018, now Pat. No. 10,666,992.
(Continued)

(51) Int. Cl.
*H04N 21/2343* (2011.01)
*H04L 43/16* (2022.01)
(Continued)

(52) U.S. Cl.
CPC ............ *H04L 65/70* (2022.05); *H04L 43/16* (2013.01); *H04L 65/612* (2022.05);
(Continued)

(58) Field of Classification Search
CPC .......................... H04N 21/238; H04N 21/2387
See application file for complete search history.

(56) References Cited

U.S. PATENT DOCUMENTS

| 5,612,742 A | 3/1997 | Krause et al. |
| 7,394,410 B1 * | 7/2008 | Wegener ............... H03M 7/30 341/50 |

(Continued)

FOREIGN PATENT DOCUMENTS

| CN | 1393109 A | 1/2003 |
| CN | 1778117 A | 5/2006 |

(Continued)

OTHER PUBLICATIONS

T. Wiegand, G. J. Sullivan, G. Bjøntegaard, and A. Luthra, "Overview of the H.264/AVC Video Coding Standard," Circuits and Systems for Video Technology, IEEE Transactions on, vol. 13, No. 7, Jul. 2003, pp. 560-576, 2003.
(Continued)

*Primary Examiner* — Hsiungfei Peng
(74) *Attorney, Agent, or Firm* — Artegis Law Group, LLP

(57) ABSTRACT

A shot analyzer varies the resolution when generating encoded video sequences for streaming. The shot analyzer generates a first encoded video sequence based on a first resolution and a source video sequence that is associated with a video title. The shot analyzer then determines a first encoded shot sequence from multiple encoded shot sequences included in the first encoded video sequence based on quality metric(s). The first encoded shot sequence is associated with a first shot sequence included in the source video sequence. Subsequently, the shot analyzer generates a second encoded shot sequence based on a second resolution and the first shot sequence. The shot analyzer generates a second encoded video sequence based on the first encoded video sequence and the second encoded shot sequence. At least a first portion of the second encoded video sequence is subsequently streamed to an endpoint device during playback of the video title.

15 Claims, 16 Drawing Sheets

Related U.S. Application Data

(60) Provisional application No. 62/550,517, filed on Aug. 25, 2017, provisional application No. 62/534,170, filed on Jul. 18, 2017.

(51) Int. Cl.

| | |
|---|---|
| *H04L 65/612* | (2022.01) |
| *H04L 65/70* | (2022.01) |
| *H04L 65/75* | (2022.01) |
| *H04N 19/132* | (2014.01) |
| *H04N 19/147* | (2014.01) |
| *H04N 19/179* | (2014.01) |
| *H04N 19/33* | (2014.01) |
| *H04N 21/234* | (2011.01) |
| *H04N 21/2662* | (2011.01) |

(52) U.S. Cl.
CPC ......... *H04L 65/765* (2022.05); *H04N 19/132* (2014.11); *H04N 19/147* (2014.11); *H04N 19/179* (2014.11); *H04N 19/33* (2014.11); *H04N 21/234363* (2013.01); *H04N 21/23439* (2013.01); *H04N 21/2662* (2013.01)

(56) References Cited

U.S. PATENT DOCUMENTS

| | | | |
|---|---|---|---|
| 8,837,601 | B2 | 9/2014 | Ronca et al. |
| 8,982,942 | B2 | 3/2015 | Gao et al. |
| 9,036,712 | B1 | 5/2015 | Cote et al. |
| 9,131,202 | B1 | 9/2015 | Espeset et al. |
| 9,398,301 | B2 | 7/2016 | Ronca et al. |
| 9,584,700 | B2 | 2/2017 | Morovic et al. |
| 10,074,382 | B2 | 9/2018 | Hoerich et al. |
| 10,097,339 | B1 | 10/2018 | Pogue |
| 10,666,992 | B2 | 5/2020 | Katsavounidis |
| 10,742,708 | B2 | 8/2020 | Katsavounidis et al. |
| 10,778,354 | B1* | 9/2020 | Hegar .............. H04N 21/23892 |
| 11,153,581 | B1 | 10/2021 | Purushe |
| 2002/0116715 | A1 | 8/2002 | Apostolopoulos |
| 2004/0161158 | A1 | 8/2004 | Kondo et al. |
| 2005/0031219 | A1 | 2/2005 | Puri et al. |
| 2005/0111824 | A1 | 5/2005 | Hunter et al. |
| 2007/0047639 | A1 | 3/2007 | Ye |
| 2007/0064793 | A1 | 3/2007 | Wang et al. |
| 2008/0043832 | A1 | 2/2008 | Barkley et al. |
| 2008/0232466 | A1 | 9/2008 | Faerber et al. |
| 2009/0295905 | A1 | 12/2009 | Civanlar et al. |
| 2010/0189183 | A1* | 7/2010 | Gu ....................... H04N 19/124 375/240.28 |
| 2010/0202671 | A1 | 8/2010 | Chen et al. |
| 2010/0290520 | A1 | 11/2010 | Kamisli et al. |
| 2011/0052087 | A1 | 3/2011 | Mukherjee |
| 2011/0069939 | A1* | 3/2011 | Choi ................ H04N 21/44008 386/278 |
| 2011/0075734 | A1 | 3/2011 | Sakazume |
| 2011/0090949 | A1 | 4/2011 | Gu |
| 2011/0286525 | A1 | 11/2011 | Kamisli et al. |
| 2012/0147958 | A1 | 6/2012 | Ronca et al. |
| 2012/0195369 | A1 | 8/2012 | Guerrero |
| 2012/0330632 | A1 | 12/2012 | Oganov et al. |
| 2013/0051768 | A1 | 2/2013 | Soroushian et al. |
| 2013/0089154 | A1 | 4/2013 | Chen et al. |
| 2013/0223510 | A1* | 8/2013 | Coudurier .......... H04N 21/8456 375/E7.026 |
| 2013/0329781 | A1* | 12/2013 | Su .................... H04N 21/23424 375/240.02 |
| 2014/0040498 | A1 | 2/2014 | Oyman et al. |
| 2014/0201324 | A1 | 7/2014 | Zhang et al. |
| 2014/0219346 | A1 | 8/2014 | Ugur et al. |
| 2014/0241418 | A1 | 8/2014 | Garbas et al. |
| 2014/0294362 | A1 | 10/2014 | Pettersson et al. |
| 2015/0071346 | A1 | 3/2015 | Ronca et al. |
| 2015/0127337 | A1 | 5/2015 | Heigold et al. |
| 2015/0179224 | A1 | 6/2015 | Bloch et al. |
| 2015/0370796 | A1 | 12/2015 | Abramson et al. |
| 2016/0094802 | A1 | 3/2016 | Thomas et al. |
| 2016/0212433 | A1 | 7/2016 | Zhu et al. |
| 2016/0379057 | A1 | 12/2016 | Katsavounidis |
| 2017/0078376 | A1 | 3/2017 | Coward et al. |
| 2017/0078686 | A1 | 3/2017 | Coward et al. |
| 2017/0186147 | A1* | 6/2017 | He ........................ G06T 7/0002 |
| 2018/0007355 | A1 | 1/2018 | Borel et al. |
| 2018/0041788 | A1 | 2/2018 | Wang et al. |
| 2018/0063536 | A1 | 3/2018 | Carmel et al. |
| 2018/0063549 | A1 | 3/2018 | Amer et al. |
| 2018/0160161 | A1 | 6/2018 | Reznik et al. |
| 2018/0240502 | A1 | 8/2018 | Katsavounidis |
| 2018/0241795 | A1 | 8/2018 | Katsavounidis |
| 2018/0242002 | A1 | 8/2018 | Katsavounidis |
| 2018/0242015 | A1 | 8/2018 | Katsavounidis |
| 2018/0302456 | A1 | 10/2018 | Katsavounidis et al. |
| 2018/0343458 | A1 | 11/2018 | Katsavounidis et al. |
| 2019/0028745 | A1 | 1/2019 | Katsavounidis |

FOREIGN PATENT DOCUMENTS

| | | |
|---|---|---|
| CN | 102668495 A | 9/2012 |
| CN | 102833538 A | 12/2012 |
| CN | 103501445 A | 1/2014 |
| CN | 103501446 A | 1/2014 |
| CN | 103918009 A | 7/2014 |
| CN | 103999090 A | 8/2014 |
| CN | 104185024 A | 12/2014 |
| CN | 104346613 A | 2/2015 |
| CN | 104737149 A | 6/2015 |
| CN | 104767999 A | 7/2015 |
| CN | 105868700 A | 8/2016 |
| CN | 106537923 A | 3/2017 |
| EP | 2 410 749 A1 | 1/2012 |
| JP | 2005-260576 A | 9/2005 |
| WO | 02/32141 A2 | 4/2002 |

OTHER PUBLICATIONS

L. Zhao, I. Katsavounidis, and C.-C. J. Kuo, "Another example of software replacing hardware: Real-time software MPEG-2 SDI/HD encoding for digital tv broadcasting," in NAB Broadcast Engineering Conference, 2003, pp. 37-40.

"The NETFLIX tech blog: High quality video encoding at scale," link: http://techblog.netflix.com/2015/12/high-quality-video-encoding-at-scale.html.

A. Ortega and K. Ramchandran, "Rate-distortion methods for image and video compression: An overview," IEEE Signal Processing Magazine, vol. 15, No. 6, pp. 23-50, 1998.

I. E. Richardson, H. 264 and MPEG-4 video compression: video coding for next-generation multimedia. John Wiley & Sons, 2004.

R. G. Keys, "Cubic convolution interpolation for digital image processing," IEEE Trans. on Acoustics, Speech, and Signal Processing, vol. ASSP-29, No. 6, pp. 1153-1160, 1981.

"Lanczos resampling," link: http://en.wikipedia.org/wiki/Lanczos resampling.

"The NETFLIX tech blog: Per-Title Encode Optimization," link: http://techblog.netflix.com/2015/12/per-title-encode-optimization.html.

I. Katsavounidis, A. Aaron, and D. Ronca, "Native resolution detection of video sequences," in SMPTE 2015 Annual Technical Conference and Exhibition. SMPTE, 2015, pp. 1-20.

"The NETFLIX tech blog: Toward a practical perceptual video quality metric," link: http://techblog.netflix.com/2016/06/toward-practical-perceptual-video.html.

"X264," link: https://en.wikipedia.org/wiki/X264, Mar. 2016.

S. Tavakoli, K. Brunnstrom, J. Gutierrez, and N. Garcia, "Quality of experience of adaptive video streaming: Investigation in service parameters and subjective quality assessment methodology," Signal Processing: Image Communication, vol. 39, pp. 432-443, 2015.

"Consumer Digital Video Library—El Fuente," link: http://www.cdvl.org/documents/ElFuente_summary.pdf.

(56) References Cited

OTHER PUBLICATIONS

G. J. Sullivan and T. Wiegand, "Rate-distortion optimization for video compression," IEEE signal processing magazine, vol. 15, No. 6, pp. 74-90, 1998.
T. Thiede, W. C. Treurniet, R. Bitto, C. Schmidmer, T. Sporer, J. G. Beerends, and C. Colomes, "Peaq-the ITU standard for objective measurement of perceived audio quality," Journal of the Audio Engineering Society, vol. 48, No. 1/2, pp. 3-29, 2000.
"Consumer Digital Video Library," link: http://www.cdvl.org.
International Search Report for application No. PCT/US2018/019575 dated Apr. 9, 2018.
International Search Report for application No. PCT/US2018/019576 dated May 4, 2018.
Westerink et al., "An Optimal Bit Allocation Algorithm for Sub-Band Coding", ICASSP-88., International Conference on Acoustics, Speech, and Signal Processing, Apr. 11-14, 1988, pp. 757-760.
Riskin, Eve A., "Optimal Bit Allocation via the Generalized BFOS Algorithm", IEEE Transactions on Information Theory, Mar. 1, 1991, vol. 37, No. 2, pp. 400-402.
Yu et al., "Efficient Rate Control for JPEG-2000", IEEE Transactions on Circuits and Systems for Video Technology, May 1, 2006, vol. 16, No. 5, pp. 577-589.
Wu et al., "Rate-Constrained Picture-Adaptive Quantization for JPEG Baseline Coders", IEEE International Conference on Acoustics, Speech, and Signal Processing, Apr. 27-30, 1993, pp. 389-392.
Sermadevi et al., "Efficient Bit Allocation for Dependent Video Coding", DCC '04 Proceedings of the Conference on Data Compression, Mar. 23, 2004, 6 pages.
Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.
Ortega et al., "Rate-Distortion Methods for Image and Video Compression", IEEE Signal Processing Magazine, Nov. 1998, vol. 15, No. 6, pp. 23-50.
International Search Report for application No. PCT/US2018/042338 dated Oct. 29, 2018.
Non-Final Office Action received for U.S. Appl. No. 15/902,976 dated Jan. 2, 2020, 36 pages.
Notice of Allowance received for U.S. Appl. No. 16/034,303 dated Jan. 14, 2020, 24 pages.
Advisory Action received for U.S. Appl. No. 15/902,970 dated Feb. 10, 2020, 13 pages.
Final Office Action received for U.S. Appl. No. 15/902,971 dated Feb. 20, 2020, 50 pages.
Non-Final Office Action received for U.S. Appl. No. 15/902,970 dated Apr. 5, 2019, 59 pages.
Final Office Action received for U.S. Appl. No. 15/902,970 dated Oct. 31, 2019, 41 pages.
Non-Final Office Action received for U.S. Appl. No. 15/902,971 dated Oct. 31, 2019, 50 pages.
Non-Final Office Action received for U.S. Appl. No. 15/902,975 dated Aug. 22, 2019, 34 pages.
Non-Final Office Action received for U.S. Appl. No. 16/016,432 dated Sep. 13, 2019, 46 pages.
Non-Final Office Action received for U.S. Appl. No. 16/034,303 dated Jul. 10, 2019, 27 pages.
Non-Final Office Action received for U.S. Appl. No. 15/902,970 dated Mar. 30, 2020, 51 pages.
Notice of Allowance received for U.S. Appl. No. 16/016,432 dated Apr. 1, 2020, 30 pages.
Non-Final Office Action received for U.S. Appl. No. 16/054,621 dated Mar. 5, 2020, 40 pages.
Notice of Allowance received for U.S. Appl. No. 15/902,975 dated Mar. 4, 2020, 28 pages.
Non-Final Office Action received for U.S. Appl. No. 16/054,621, dated Mar. 5, 2020, 35 pages.
Final Office Action received for U.S. Appl. No. 16/054,621, dated Aug. 25, 2020, 29 pages.
Non-Final Office Action received for U.S. Appl. No. 15/902,971, dated Jul. 2, 2020, 36 pages.
International Search Report for application No. PCT/US2020/046017 dated Oct. 12, 2020.
Tan et al., "Video Quality Evaluation Methodology and Verification Testing of HEVC Compression Performance", IEEE Transactions on Circuits and Systems for Video Technology, XP011592174, DOI: 10.1109/TCSVT.2015.2477916, vol. 26, No. 1, Jan. 1, 2016, pp. 76-90.
Hanhart et al., "Calculation of average coding efficiency based on subjective quality scores", Journal of Visual Communication and Image Representation, Academic Press, XP028661468, http://dx.doi.org/10.1016/j.jvcir.2013.11.008, vol. 25, No. 3, Dec. 4, 2013, pp. 555-564.
Final Office Action received for U.S. Appl. No. 15/902,976 dated Jul. 10, 2020, 54 pages.
"Advanced video coding for generic audiovisual services", I T U-T Rec. H.264 and ISO/IEC 14496-10 (AVG), 2003, 282 pages.
"High effciency video coding", I T U-T Rec. H.265 and ISO/IEC 23008-2 (HEVC), 2013, 317 pages.
Grange et al., "VP9 Bitstream & Decoding Process Specification", Version 0.6, Retrieved from https://storage.googleapis.com/downloads.webmprojecl.org/docs/vp9/vp9-bitstream-specification-v0.6-20160331-draft.pdf, 2016, 171 pages.
Buehring, Karsten, "H.264/AVC software", http://iphome.hhi.de/suehring/tml/, retrieved May 17, 2020, 1 page.
"High Efficiency Video Coding (HEVC) I JCT-VG", Fraunhofer Heinrich Hertz Institute, hllps://hevc.hhi.fraunhofer.de, retrieved Apr. 17, 2020, 2 pages.
"Webproject / libvpx", https://github.com/webmprojecl/libvpx, retrieved Apr. 17, 2020, 5 pages.
Bjontegaard, Gisle, "Calculation of average psnr differences between rd curves," I T U-T Q.6/SG16 VCEG 13th meeting, https://www.itu.int/wflp3/av-arch/video-site/0104_Aus/VCEG-M33.doc, 2001, 4 pages.
Katsavounidis, Ioannis, "Netflix—"El Fuente" video sequence details and scenes", Jul. 28, 2015, http://www.cdvl.org/documents/ElFuente_summary.pdf, 64 pages.
Katsavounidis, Ioannis, "Netflix—"Chimera" video sequence details and scenes", Nov. 2, 2015, https://www.cdvl.org/documents/NETFLIX_Chimera_4096x2160_Download_Instructions.pdf, 189 pages.
Wang et al., "Image Quality Assessment: From Error Visibility to Structural Similarity", DOI: 10.1109/TIP.2003.819861, IEEE Transactions on Image Processing, vol. 13, No. 4, Apr. 2004, pp. 600-612.
Sheikh et al., "Image Information and Visual Quality", DOI:10.1109/TIP.2005.859378, IEEE Transactions on ImageProcessing, vol. 15, No. 2, Feb. 2006, pp. 430-444.
Netflix / VMAF, https://github.com/Netflix/vmaf, retrieved Apr. 17, 2020, 4 pages.
Li et al., "Full-Reference Video Quality Assessment by Decoupling Detail Losses and Additive Impairments", DOI:10.1109/TCSVT.2012.2190473, Circuits and Systems for Video Technology, IEEE Transactions, vol. 22, No. 7, Jul. 2012, pp. 1100-1112.
Winkler, Stefan, "Analysis of Public Image and Video Databases for Quality Assessment", DOI:10.1109/JSTSP.2012.2215007, IEEE Journal of Selected Topics in Signal Processing, vol. 6, No. 6, Oct. 2012, pp. 516-625.
Cortes et al., "Support-Vector Networks", Machine Learning, vol. 20, 1995, pp. 273-297.
Katsavounidis, Ioannis, "Dynamic optimizer—a perceptual video encoding optimization framework", Netflix Technology Blog, https://netflixtechblog.com/dynamic-optimizer-a-perceptual-video-encoding-optimization-framework-e19f1e3a277f, Mar. 5, 2018, 22 pages.
Manohara et al., "Optimized shot-based encodes: Now streaming!", Netflix Technology Blog, https://netflixtechblog.com/optimized-shot-based-encodes-now -streaming-4b9464204830, Mar. 9, 2018, 9 pages.
"Mirror / x264", https://github.com/mirror/x264, retrieved May 17, 2020, 1 page.
"FFmpeg / FFmpeg", https://github.com/FFmpeg/FFmpeg, retrieved May 17, 2020, 3 pages.
"Videolan / x265", https://github.com/videolan/x265, retrieved May 17, 2020, 1 page.

(56) References Cited

OTHER PUBLICATIONS

"Eve-VP9 Maximize the Capabilities of VP9 for Your Video Streaming", Two Orioles, https://www.twoorioles.com/eve-vp9, retrieved May 17, 2020, 7 pages.
Netflix Technology Blog, https://netflixtechblog.com/per-title-encode-optimization-7e99442b62a2, Dec. 14, 2015, retrieved Feb. 20, 2018, 17 pages.
Wang et al., "Videoset: A large-scale compressed video quality dataset based on JND measurement", http://dx.doi.org/10.1016/j.jvcir.2017.04.009, Journal of Visual Communication and Image Representation, vol. 46, 2017, pp. 292-302.
Mareddy et al., "Simplifying Media Innovation at Netflix with Archer", Netflix Technology Blog, https://netflixtechblog.com/simplifying-media-innovation-at-netflix-with-archer-3f8cbb0e2bcb, Jun. 20, 2018, retrieved May 4, 2020, 20 pages.
Non-Final Office Action received for U.S. Appl. No. 16/543,476 dated Jul. 6, 2020, 97 pages.
Notice of Allowance received for U.S. Appl. No. 15/902,970 dated Sep. 4, 2020, 44 pages.
Notice of Allowance received for U.S. Appl. No. 16/054,621 dated Jan. 27, 2021, 23 pages.
Final Office Action received for U.S. Appl. No. 15/902,971 dated Dec. 10, 2020, 51 pages.
Notice of Allowance received for U.S. Appl. No. 15/902,976 dated Sep. 30, 2020, 18 pages.
Non-Final Office Action received for U.S. Appl. No. 16/543,476 dated Jan. 7, 2021, 129 pages.
Notice of Allowance received for U.S. Appl. No. 16/034,303 dated Dec. 4, 2019, 15 pages.
Non-Final Office Action received for U.S. Appl. No. 16/882,386 dated Oct. 9, 2020, 42 pages.
Non-Final Office Action received for U.S. Appl. No. 15/902,971 dated Mar. 17, 2021, 46 pages.
Notice of Allowance received for U.S. Appl. No. 16/054,621 dated Apr. 16, 2021, 23 pages.
Non-Final Office Action received for U.S. Appl. No. 16/882,386 dated Apr. 6, 2021, 21 pages.
Non-Final Office Action received for U.S. Appl. No. 15/902,971, dated Mar. 17, 2021, 36 pages.
Ortega, Antonio, "Optimal bit allocation under multiple rate constraints", Proceedings of Data Compression Conference—DCC '96, 10.1109/DCC.1996.488340, 1996, pp. 349-358.
Notice of Allowance received for U.S. Appl. No. 16/054,621 dated Jun. 10, 2021, 14 pages.
Notice of Allowance received for U.S. Appl. No. 16/543,476 dated Jun. 25, 2021, 16 pages.
Notice of Allowance received for U.S. Appl. No. 15/902,971 dated Jul. 21, 2021, 17 pages.
Non Final Office Action received for U.S. Appl. No. 16/987,331 dated Nov. 29, 2021, 54 pages.
Final Office Action received for U.S. Appl. No. 16/882,386 dated Sep. 30, 2021, 28 pages.
Non Final Office Action received for U.S. Appl. No. 17/151,079 dated Nov. 24, 2021, 47 pages.
Non Final Office Action received for U.S. Appl. No. 16/882,386 dated Mar. 28, 2022, 17 pages.
Non Final Office Action received for U.S. Appl. No. 17/170,661 dated Mar. 2, 2022, 44 pages.
Notice of Allowance received for U.S. Appl. No. 16/987,331 dated Apr. 20, 2022, 17 pages.
Final Office Action received for U.S. Appl. No. 17/170,661 dated Aug. 22, 2022, 30 pages.
Non Final Office Action received for U.S. Appl. No. 17/151,079 dated Sep. 29, 2022, 17 pages.
Notice of Allowance received for U.S. Appl. No. 16/882,386 dated Oct. 13, 2022, 20 pages.
Final Office Action received for U.S. Appl. No. 17/151,079 dated Jun. 2, 2022, 21 pages.
Non Final Office Action received for U.S. Appl. No. 17/532,869 dated May 22, 2023, 84 pages.
Notice of Allowance received for U.S. Appl. No. 17/504,412 dated Jun. 1, 2023, 17 pages.
Notice of Allowance received for U.S. Appl. No. 17/170,661 dated Jul. 3, 2023, 25 pages.
Notice of Allowance received for U.S. Appl. No. 17/516,525 dated Jul. 12, 2023, 17 pages.
Notice of Allowance received for U.S. Appl. No. 17/151,079 dated Apr. 19, 2023, 18 pages.
Final Office Action received for U.S. Appl. No. 17/532,869 dated Nov. 2, 2023, 46 pages.
Non Final Office Action received for U.S. Appl. No. 17/532,869 dated Feb. 26, 2024, 39 pages.
Non Final Office Action received for U.S. Appl. No. 17/504,412 dated Feb. 2, 2023, 50 pages.
Non Final Office Action received for U.S. Appl. No. 17/516,525 dated Mar. 17, 2023, 48 pages.
Non Final Office Action received for U.S. Appl. No. 18/486,986 dated May 23, 2024, 35 pages.
Final Office Action received for U.S. Appl. No. 17/532,869 dated Aug. 16, 2024, 47 pages.
Notice of Allowance received for U.S. Appl. No. 18/486,986 dated Sep. 11, 2024, 12 pages.
Notice of Allowance received for U.S. Appl. No. 17/532,869 dated Dec. 18, 2024, 13 pages.

* cited by examiner

ENCODING TECHNIQUES FOR OPTIMIZING DISTORTION AND BITRATE

CROSS-REFERENCE TO RELATED APPLICATIONS

This application is a continuation-in-part of the U.S. patent application titled "ENCODING TECHNIQUES FOR OPTIMIZING DISTORTION AND BITRATE," filed on Jul. 12, 2018, and having Ser. No. 16/034,303, which claims the priority benefit of the United States Provisional patent application titled "ENCODING TECHNIQUE FOR OPTIMIZING DISTORTION AND BITRATE", filed on Jul. 18, 2017 and having Ser. No. 62/534,170. This application also claims the priority benefit of the United States Provisional patent application titled "ENCODING TECHNIQUE FOR OPTIMIZING DISTORTION AND BITRATE", filed on Aug. 25, 2017 and having Ser. No. 62/550,517. The subject matter of these related applications are hereby incorporated herein by reference.

BACKGROUND OF THE INVENTION

Field of the Invention

Embodiments of the present invention relate generally to video encoding and, more specifically, to encoding techniques for optimizing distortion and bitrate.

Description of the Related Art

A video streaming service provides access to a library of media titles that can be played on a range of different endpoint devices. Each endpoint device may connect to the video streaming service under different connection conditions, including available bandwidth and latency, among others. In addition, each different device may include different hardware for outputting the video content to the end user. For example, a given endpoint device could include a display screen having a particular screen size and a particular screen resolution.

Typically, an endpoint device that connects to a video streaming service executes an endpoint application that determines, for a given media title in the video content library, an appropriate version of the media title to stream to the endpoint device. Each different version of a given media title is usually encoded using a different bitrate, and the different versions of the media title have resolutions, scaling factors, and/or other parameters typically associated with video content that differ from one another. During playback of the media title on the endpoint device, the endpoint application selects the appropriate version of the media title to stream to the endpoint device based on factors such as network conditions, the quality of the network connection, and the hardware specifications of the endpoint device.

As noted above, to prepare a media title for streaming in the manner described above, the media title is encoded using multiple different bitrates. In doing so, an encoding application performs individual, "monolithic" encodes of the entire media title, using a different set of encoding parameters for each encode. Each different encode may be associated with a different quality metric that objectively indicates the level of distortion introduced into that encoded version of the media title via the encoding process. The quality metric associated with a given encode typically depends on the encoding parameters used to generate that encode. For example, an encode generated with a high bitrate compared to another encode could have a higher quality metric compared to that other encode.

Encoding a media title with different encoding parameters typically requires different computational resources and different storage resources. For example, generating an encode with a high bitrate and high quality metric generally consumes more computational/storage resources than generating an encode with a low bitrate and low quality metric. A conventional encoding application may select a given set of encoding parameters for generating a single monolithic encode in order to meet a particular target quality metric for that encode.

However, one problem with this approach is that not all portions of a media title require the same encoding parameters to meet a given target quality metric, yet conventional encoding applications use the same encoding parameters for the entire media title. Consequently, a conventionally-encoded media title may consume excessive computational and storage resources to meet the target quality metric, despite some portions of the media title not needing those resources to meet the same metric. This inefficiency needlessly wastes computational resources and storage resources.

As the foregoing illustrates, what is needed in the art is a more efficient technique for encoding video sequences.

SUMMARY OF THE INVENTION

One embodiment of the present invention sets forth a computer-implemented method for varying the resolution when generating a set of encoded video sequences. The method includes generating a first encoded video sequence based on a first resolution and a source video sequence that is associated with a video title; determining a first encoded shot sequence from a plurality of encoded shot sequences included in the first encoded video sequence based on one or more quality metrics; generating a second encoded shot sequence based on a second resolution and a first shot sequence that is included in the source video sequence and associated with the first encoded shot sequence; and generating a second encoded video sequence based on the first encoded video sequence and the second encoded shot sequence, where at least a first portion of the second encoded video sequence is subsequently streamed to an endpoint device during playback of the video title.

At least one technological improvement of the disclosed techniques relative to prior art is that varying the resolution when encoding individual shot sequences included in an encoded video sequence reduces encoding the inefficiencies typically associated with conventional encoding techniques. Such encoding inefficiencies not only needlessly waste computational and storage resources, the inefficiencies also unnecessarily increase the bandwidth required to stream encoded versions of video titles to endpoint devices. In the disclosed techniques, because each shot sequence is encoded based on a resolution that is optimized for the shot sequence, the encoded video sequence can be streamed to endpoint devices with an increased visual quality for a target bitrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As discussed above, conventional encoding techniques suffer from specific inefficiencies associated with performing "monolithic" encodes of video sequences. These inefficiencies arise because conventional encoding techniques encode all portions of a video sequence with the same encoding parameters to meet a given quality metric, despite the fact that some portions of the video sequence could be encoded with different encoding parameters and still meet the same quality metric.

To address this issue, embodiments of the present invention include an encoding engine configured to encode different shot sequences within a source video sequence with different encoding parameters that optimize bitrate for a given level of distortion. When encoding a shot sequence, the encoding engine resamples the shot sequence to a range of different resolutions and then encodes each resampled sequence using a range of quality parameters. The encoding engine then upsamples each encoded sequence to the original resolution of the source video sequence and computes a quality metric for the resultant upsampled sequences. Based on the upsampled sequences and corresponding quality metrics for each shot sequence, the encoding engine generates different encoded versions of the source video sequence. Each such version is a composite of multiple shot sequences encoded with potentially different encoding parameters.

An advantage of this approach is that portions of the source video sequence needing specific encoding parameters to meet a given quality metric are encoded with precisely those specific encoding parameters. Further, other portions of the source video sequence can be encoded with other appropriately chosen encoding parameters. Accordingly, encoded versions of the source video sequence are generated in a more efficient manner.

System Overview

Figure 1A:
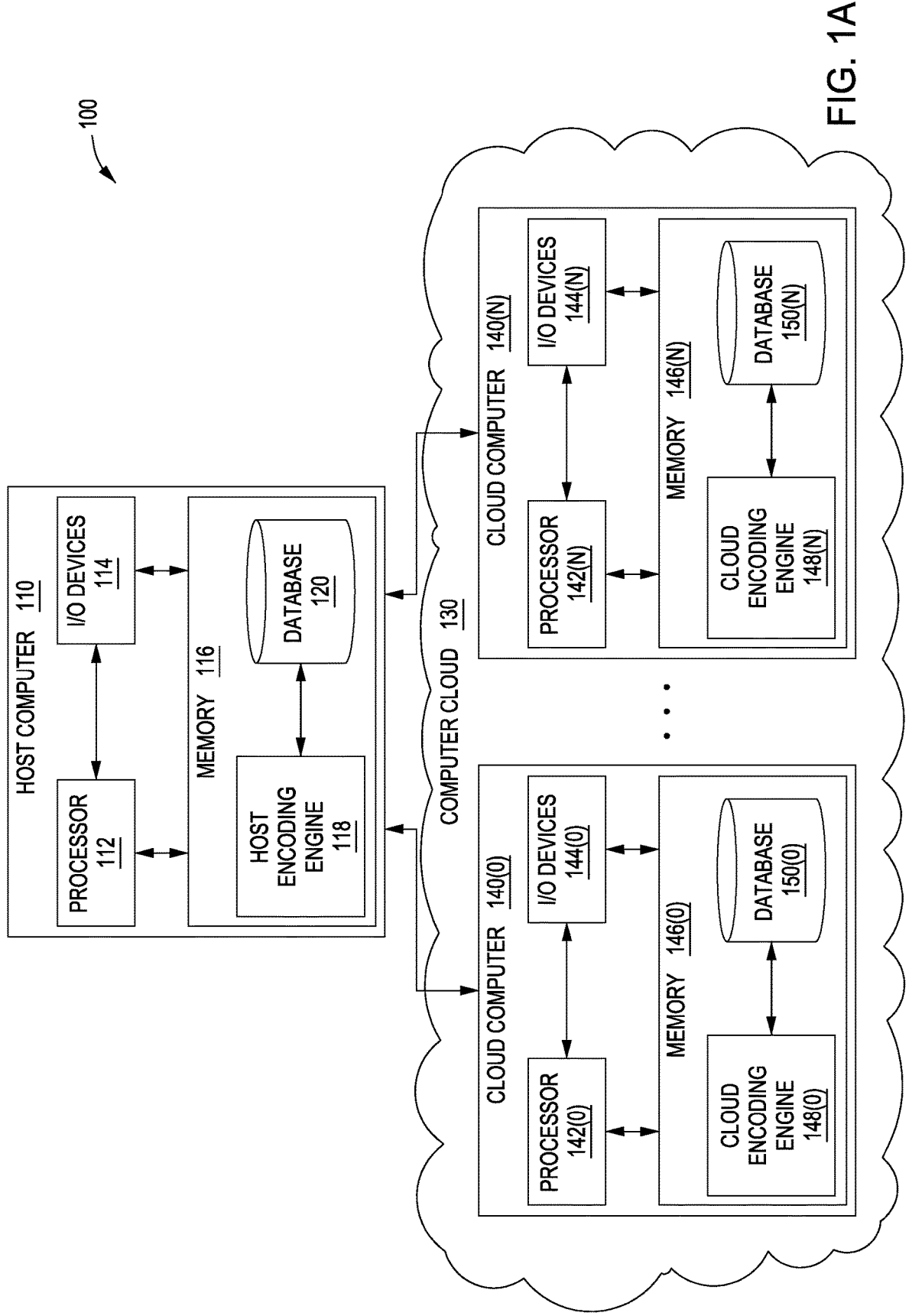
FIG. 1A illustrates a cloud computing environment configured to implement one or more aspects of the present invention.

FIG. 1A illustrates a cloud-computing environment configured to implement one or more aspects of the present invention. As shown, a system 100 includes a host computer 110 coupled to a computer cloud 130. Host computer 110 includes a processor 112, input/output (I/O) devices 114, and a memory 116 coupled together.

Processor 112 may be any technically feasible form of processing device configured to process data and execute program code. Processor 112 could be, for example, a central processing unit (CPU), a graphics processing unit (GPU), an application-specific integrated circuit (ASIC), a field-programmable gate array (FPGA), any technically feasible combination of such units, and so forth.

I/O devices 114 may include devices configured to receive input, including, for example, a keyboard, a mouse, and so forth. I/O devices 114 may also include devices configured to provide output, including, for example, a display device, a speaker, and so forth. I/O devices 114 may further include devices configured to both receive and provide input and output, respectively, including, for example, a touchscreen, a universal serial bus (USB) port, and so forth.

Memory 116 may include any technically feasible storage medium configured to store data and software applications. Memory 116 could be, for example, a hard disk, a random access memory (RAM) module, a read-only memory (ROM), and so forth. Memory 116 includes a host encoding engine 118 and a database 120.

Host encoding engine 118 is a software application that, when executed by processor 112, performs an encoding operation with media content stored within database 120 and/or an external storage resource. Host encoding engine 118 is configured to interoperate with various cloud encoding engines discussed in greater detail below.

Computer cloud 130 includes a plurality of cloud computers 140(0) through 140(N). Any cloud computer 140 may be a physically separate computing device or a virtualized instance of a computing device. Each cloud computer 140 includes a processor 142, I/O devices 144, and a memory 146, coupled together. A given processor 142 may be any technically feasible form of processing device configured to process data and execute program code, including a CPU, a GPU, an ASIC, an FPGA, any technically feasible combination of such units, and so forth. A given set of I/O devices 144 may include devices configured to receive input, including, for example, a keyboard, a mouse, and so forth, similar to I/O devices 114 discussed above. Each memory 146 is a storage medium configured to store data and software applications, including cloud encoding engine 148 and database 150.

Cloud encoding engines 148(0) through 148(N) are configured to interoperate with host encoding engine 118 in order to perform various portions of an encoding operation. In general, host encoding engine 118 coordinates the operation of cloud encoding engines 148(0) through 148(N), and may perform tasks such as distributing processing tasks to those engines, collecting processed data from each engine, and so forth. Persons familiar with cloud computing will understand that cloud encoding engines 148(0) through 148(N) may operate substantially in parallel with one another. Accordingly, host encoding engine 118 may perform complex encoding tasks efficiently by configuring cloud encoding engines 148 to perform separate tasks simultaneously. As a general matter, host encoding engine 118 and cloud encoding engines 148 represent different modules within a distributed software entity, as described in greater detail below in conjunction with FIG. 1B.

Figure 1B:
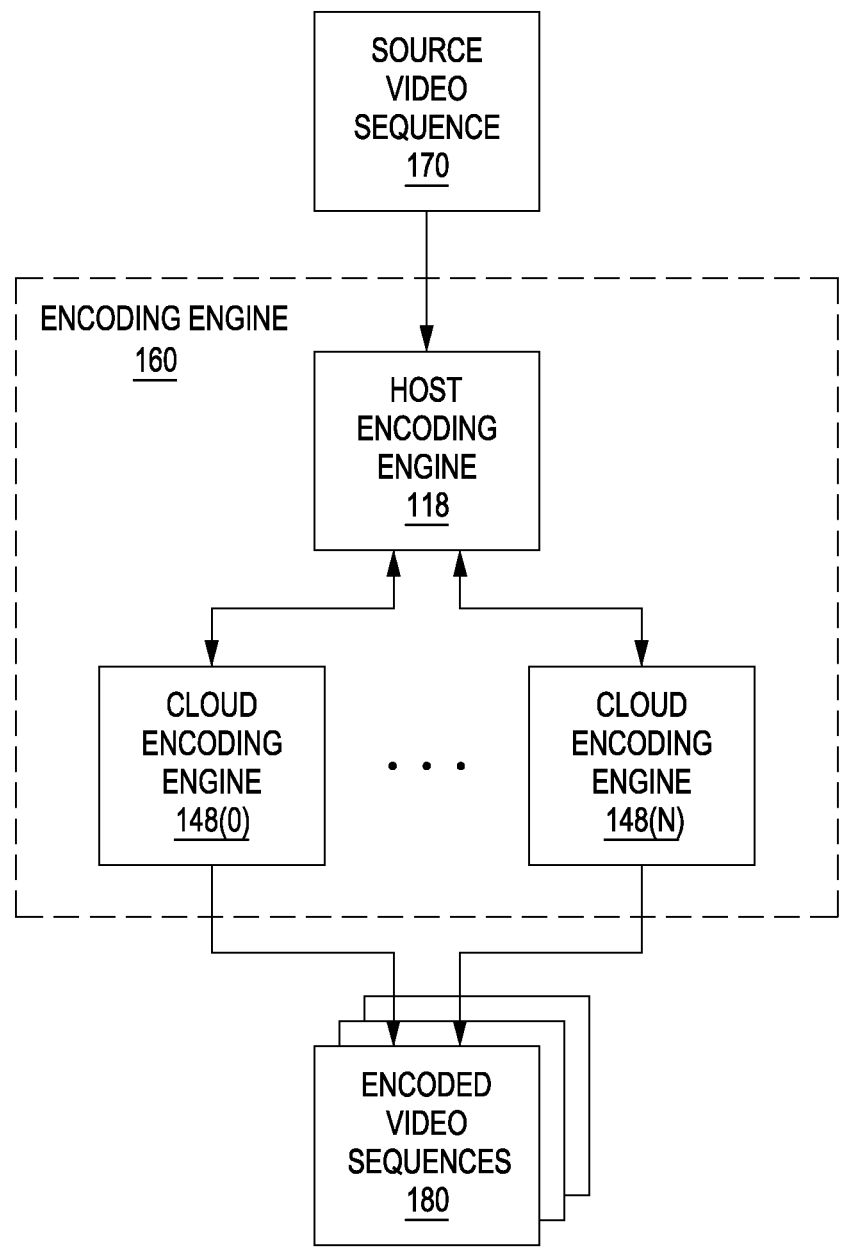
FIG. 1B is a more detailed illustration of the encoding engines of FIG. 1A, according to various embodiments of the present invention.

FIG. 1B is a more detailed illustration of the encoding engines of FIG. 1A, according to various embodiments of the present invention. As shown, an encoding engine 160 includes host encoding engine 118 and cloud encoding engines 148(0) through 148(N). As a general matter, encoding engine 160 constitutes a distributed software entity configured to perform one or more different encoding operations via execution of host encoding engine 118 and cloud encoding engines 140. In particular, encoding engine 160 processes a source video sequence 170 to generate a set of encoded video sequences 180. Source video sequence 170 is a media title that may be included in a content library associated with a video streaming service. Each encoded video sequence 180 is a different version of that media title encoded with different (and potentially varying) encoding parameters. Encoding engine 160 is configured to perform one or more of at least three different approaches to generating encoded video sequences 180, according to the various embodiments discussed below.

In one embodiment, encoding engine 160 encodes source video sequence 170 into a variety of different target resolutions. Encoding engine 160 then processes the lowest-resolution encoded version to identify one or more shot sequences. Each shot sequence includes frames captured continuously from a given camera or point of capture, including a virtual representation of a camera (e.g., in the case of computer animated video sequences). A procedure for identifying shot sequences is discussed in greater detail below in conjunction with FIG. 2A.

Encoding engine 160 then generates a set of key frames for one of the available resolutions, preferably the lowest-resolution encoded sequence, where each key frame is aligned to the first frame of a shot sequence. Depending on the length of a given shot sequence, additional key frames may be introduced in regular intervals following the first frame of a shot sequence, according to the constraints of a video streaming service. As an example, shot analyzer 200 can introduce additional key frames every 2 seconds, for shot sequences that have a duration longer than 2 seconds. To avoid very short intervals between key frames, shot analyzer 200 may impose a minimum shot sequence duration, for example 0.5 seconds, and also if the placement of the last key frame in a shot sequence would be very near the first key frame of the subsequent shot sequence, then shot analyzer 200 can reposition the key frame by equally dividing the number of frames between the immediately previous key frame in the current shot sequence and the first key frame of the subsequent shot sequence. For example, in the case of a shot sequence with duration 3 seconds, and given a streaming constraint of maximum key frame distance of 2 seconds, shot analyzer 200 could place the second key frame of this sequence at a temporal distance of 1.5 seconds. In this way, there would be equal time distance of this second key frame with respect to the first key frame of the current shot sequence, as well as that to the first key frame of the subsequent shot sequence. Encoding engine 160 then collects the temporal location of the selected key frames, as described previously and makes a list of key frames that is used with the other encoded versions of different resolutions, thereby creating a different but temporally aligned set of key frames for each encoded version of source video sequence 170. For a given encoded version, encoding engine 160 inserts the corresponding set of key frames into the encoded version at boundaries between shot sequences.

In this manner, encoding engine 160 generates encoded video sequences 180. Each encoded video sequence 180 includes key frames aligned to the same shot boundaries as other encoded sequences. Accordingly, during playback a video player may switch between encoded video sequences 180 at shot boundaries, thereby performing an improved form of adaptive streaming. This encoding procedure is described in greater detail below in conjunction with FIG. 2A.

In another embodiment, encoding engine 160 generates an ensemble of encoded video sequences 180 having mixed resolutions. To implement this approach, encoding engine 160 first encodes source video sequence 170 to a low resolution and then identifies shot sequences and corresponding shot boundaries within that sequence via the technique discussed above. Encoding engine 160 also generates key frames aligned to shot boundaries in the manner also discussed above.

Encoding engine 160 then generates a high-resolution encoded version and assigns a quality metric to each shot sequence. The quality metric could be based on the amount of high frequency energy found in each shot sequence, or could be based on a video multimethod assessment fusion (VMAF) metric or harmonic VMAF, for example. Encoding engine 160 then selects the shot sequence with the highest quality parameter and encodes that shot sequence to a lower resolution, thereby creating a new encoded version with mixed resolution. This procedure is described in greater detail below in conjunction with FIG. 2B.

In yet another embodiment, encoding engine 160 cuts source video sequence 170 into a plurality of shot sequences using the aforementioned shot sequence identification technique. Encoding engine 160 then resamples each shot sequence into one or more different resolutions, and processes all resampled sequences to generate a dataset. The resampling process is discussed in conjunction with FIG. 3. Generation of the dataset based on resampled sequences is discussed in conjunction with FIG. 4.

Figure 4:
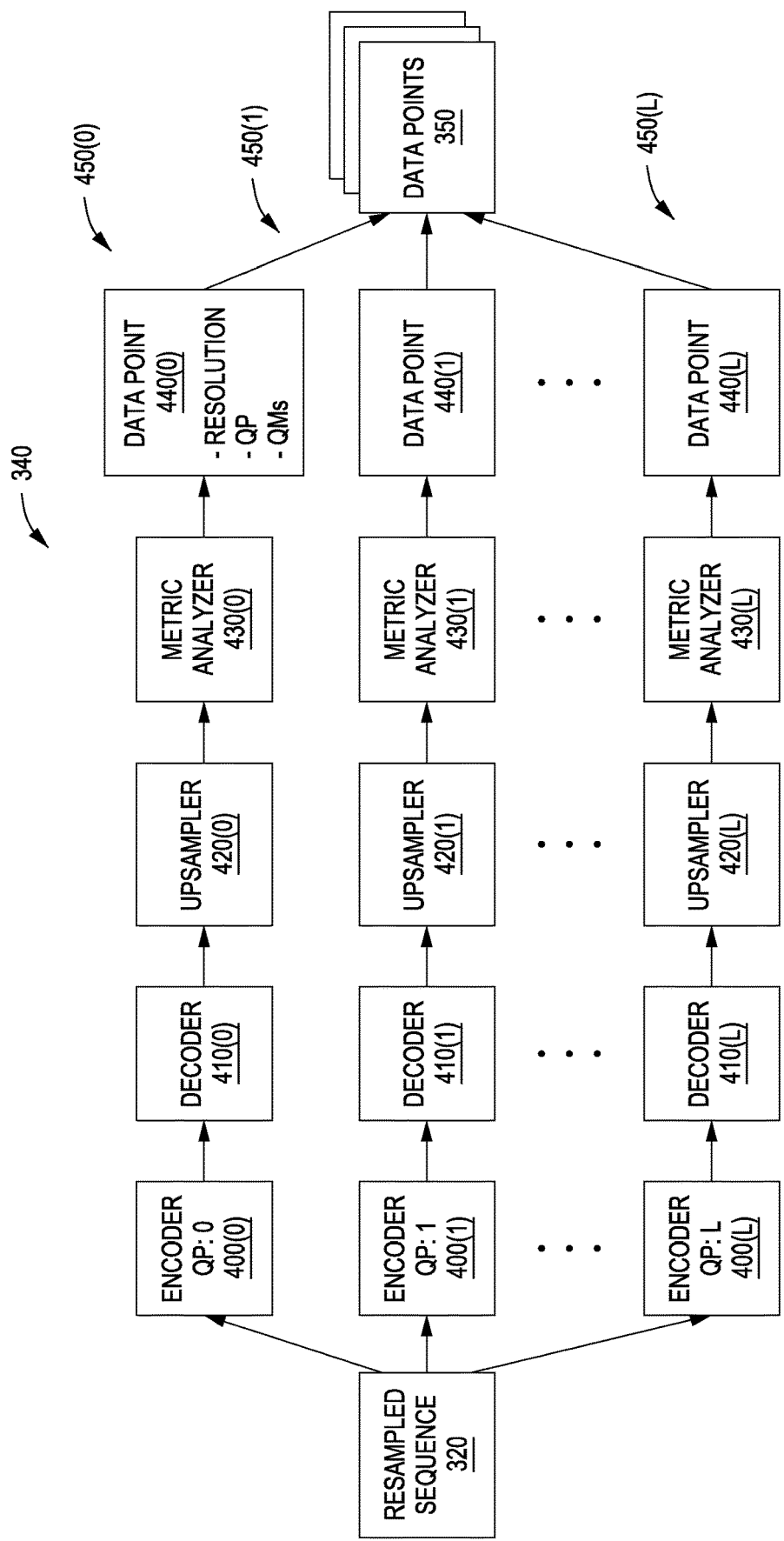
FIG. 4 is a more detailed illustration of the processing pipeline of FIG. 3, according to various embodiments of the present invention.
Figure 5A:
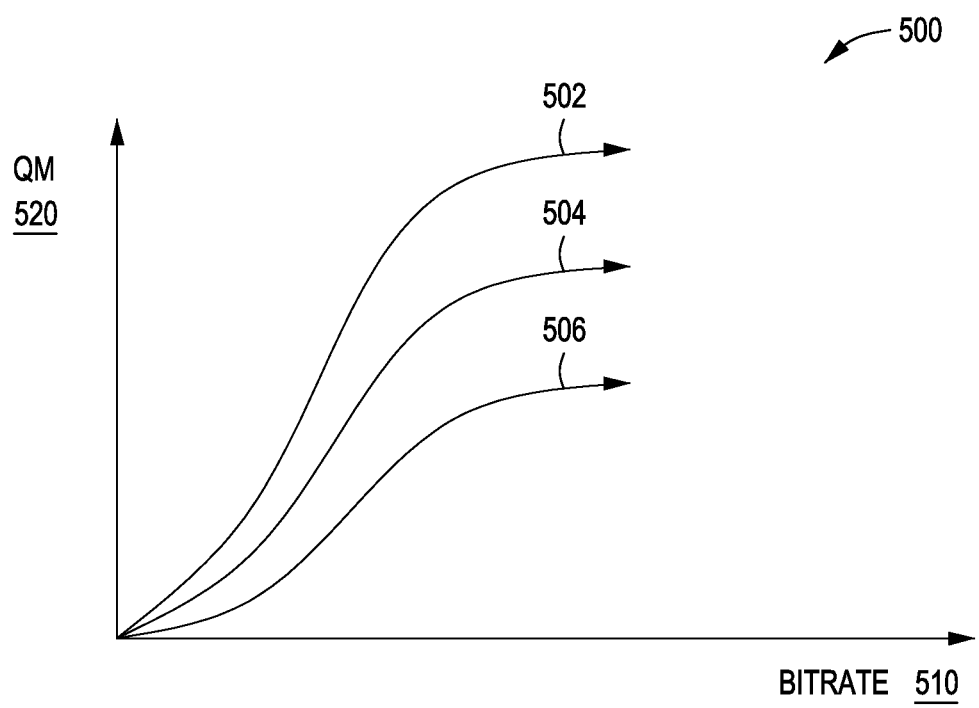
FIG. 5A is a graph of bitrate versus quality that is generated based on the dataset of FIG. 3, according to various embodiments of the present invention.
Figure 5B:
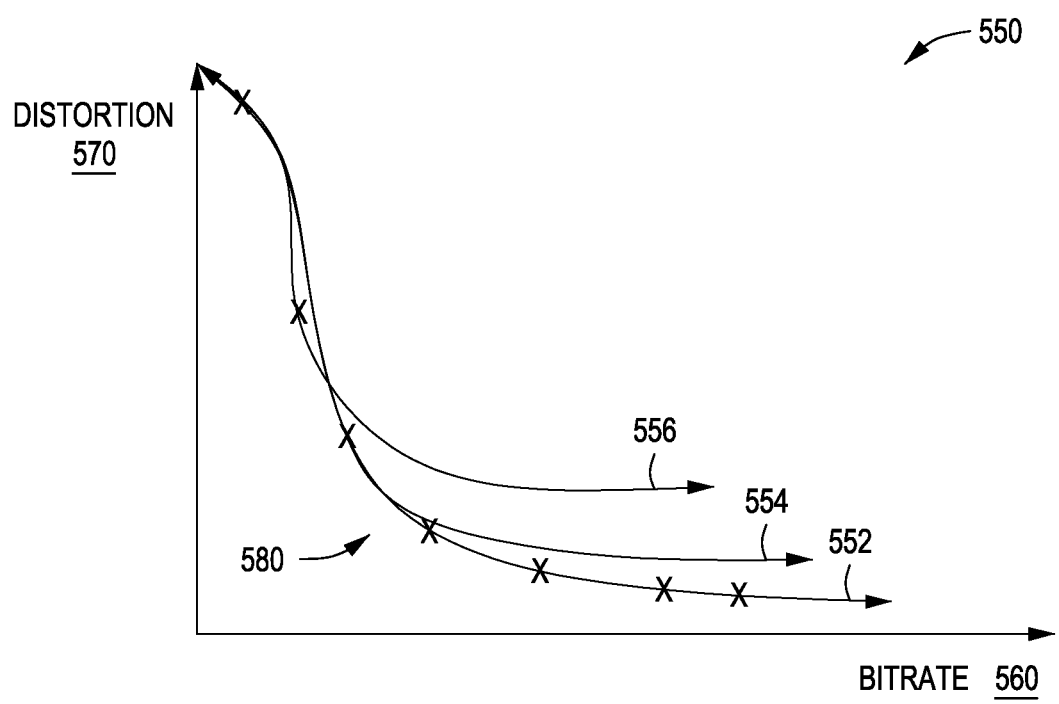
FIG. 5B is a graph of convex hull data points that is generated based on the dataset of FIG. 3, according to various embodiments of the present invention.
Figure 6:
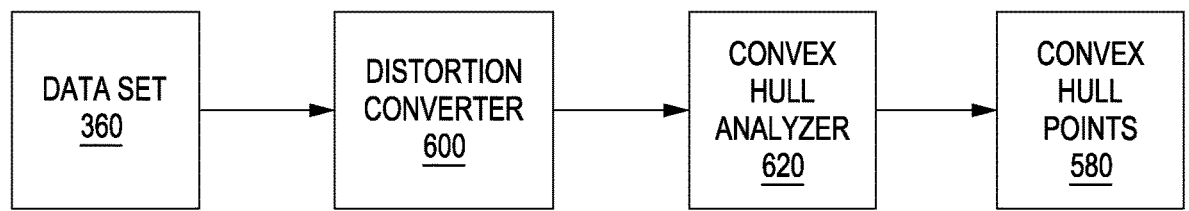
FIG. 6 illustrates how the encoding engines of FIG. 1B generate the convex hull data points of FIG. 5B, according to various embodiments of the present invention.

Encoding engine 160 then generates, based on the dataset, a convex hull of data points that maximize bitrate for a given level of distortion, as discussed in conjunction with FIGS. 5A-5B and FIG. 6. Based on all convex hull points across all shot sequences, encoding engine 160 generates the set of encoded video sequences 180. These encoded video sequences optimize distortion and bitrate, as discussed in conjunction with FIGS. 7-9. The encoding operation discussed in conjunction with FIGS. 3-9 is also presented as a series of steps in conjunction with FIGS. 10-11.

Optimizing Distortion and Bitrate

Figure 2A:
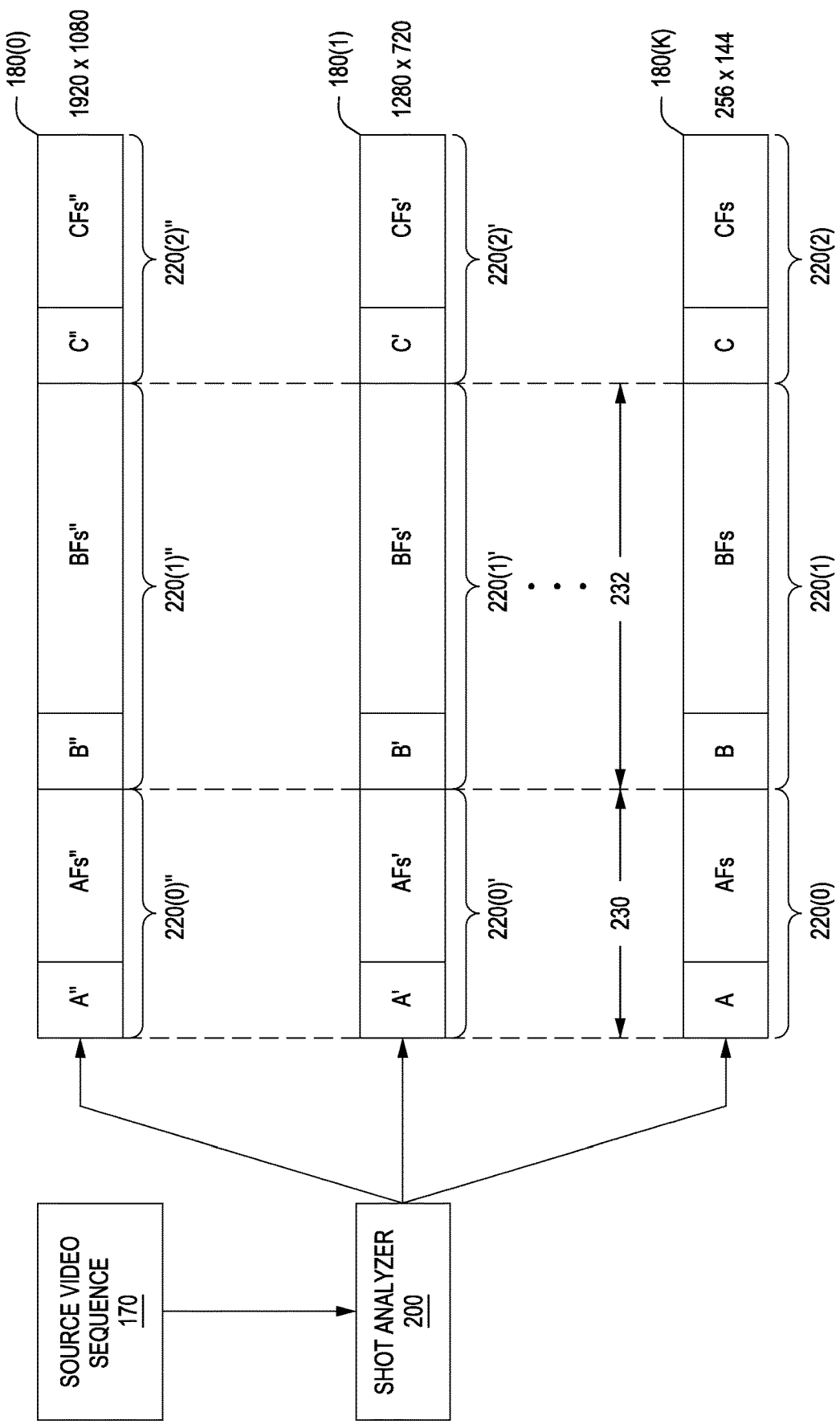
FIG. 2A illustrates how the encoding engines of FIG. 1B generate key frames for encoded video sequences, according to various embodiments of the present invention.
Figure 2B:
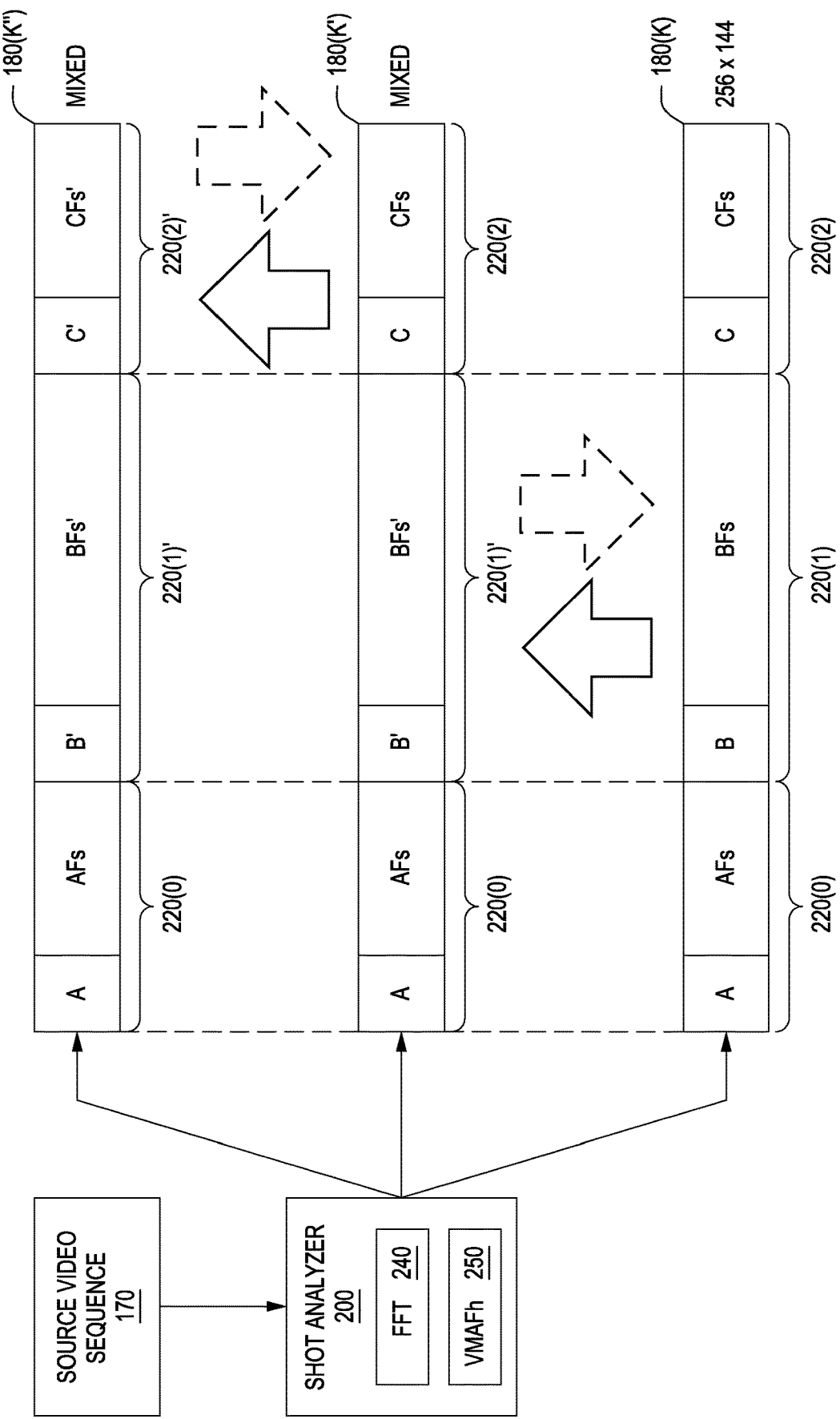
FIG. 2B illustrates how the encoding engines of FIG. 1B generate encoded video sequences with mixed resolutions, according to various embodiments of the present invention.
Figure 2C:
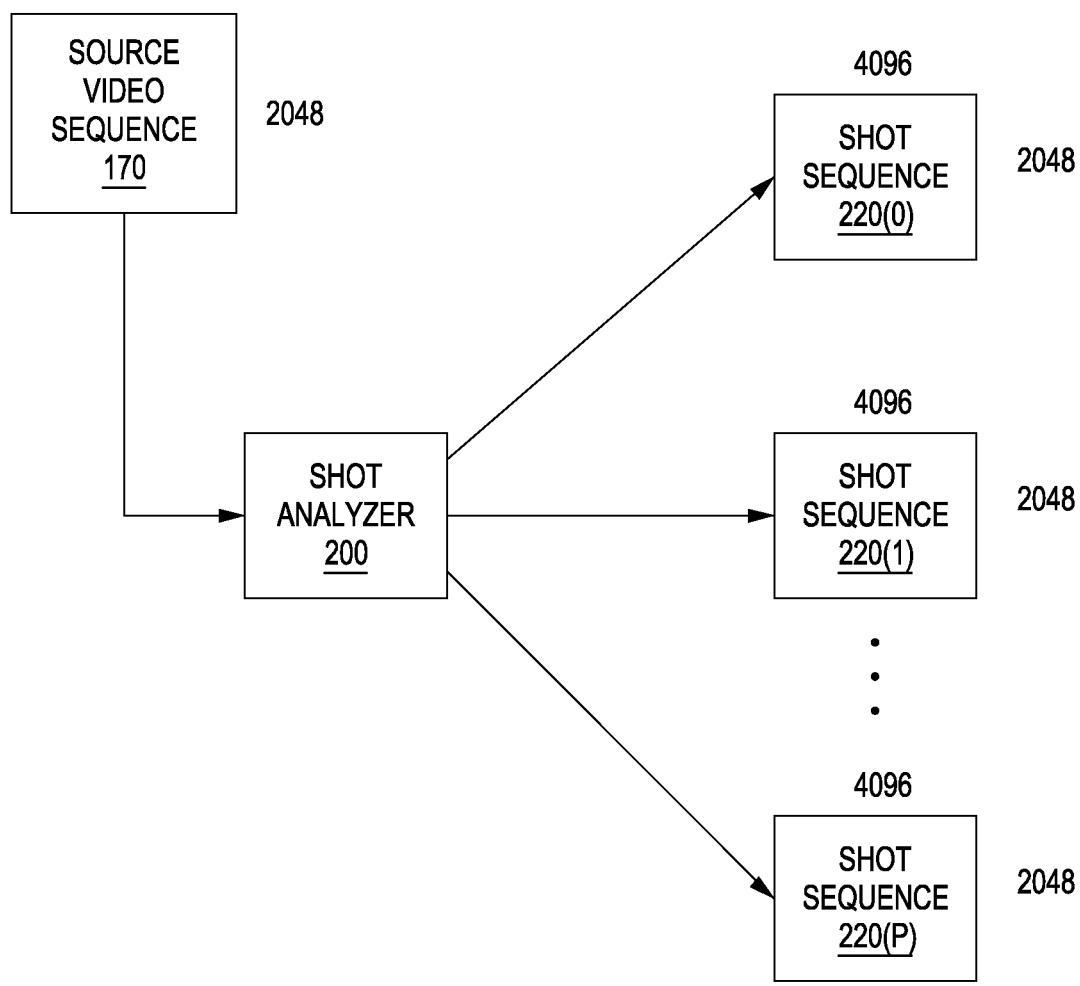
FIG. 2C illustrates how the encoding engines of FIG. 1B cut a video sequence into shot sequences, according to various embodiments of the present invention.

As discussed above, encoding engine 160 may perform different encoding operations according to at least three different embodiments. In any of these embodiments, and as shown in FIGS. 2A-2C, a shot analyzer 200 generates shot sequences 220. As mentioned, each shot sequence includes frames captured from the same physical or virtual camera on a continuous basis.

Shot analyzer 200 may determine which frames of source video sequence 170 correspond to each different shot sequence 220 using many different techniques. For example, shot analyzer 200 could identify a set of sequential frames having a continuous distribution of pixel values that do not change significantly across a subset of two or more sequential frames. Alternatively, shot analyzer 200 could compare features present in each frame and identify sequential frames having similar features.

Persons skilled in the art will understand that many techniques for identifying shot sequences exist. Persons skilled in the art will also understand that shot analyzer 200 may be implemented as a software module within encoding engine 160 or a dedicated hardware unit. Additional operations performed by shot analyzer 200 during encoding are discussed in greater detail below.

FIG. 2A illustrates how the encoding engines of FIG. 1B generate key frames for encoded video sequences, according to various embodiments of the present invention. As shown, shot analyzer 200 processes source video sequence 170 to generate encoded video sequences 180(0) through 180(K). All encoded video sequences 180 include key frames aligned to corresponding shot sequence boundaries. Shot analyzer 200 generates encoded video sequences 180 with aligned key frames via the following procedure.

First, shot analyzer 200 encodes source video sequence 170 to a set of different resolutions, including 256×144, 1280×720, and 1920×1080, as is shown. Shot analyzer 200 then analyzes the lowest resolution encoding (encoded video sequence 180(K)) to identify shot sequences 220(0), 220(1), and 220(2). In doing so, shot analyzer 200 implement the shot sequence identification techniques described previously. Shot analyzer 200 then generates key frames A, B, and C and inserts those key frames into shot sequences 220(0), 220(1), and 220(2) at shot sequence boundaries. Each shot sequence 220 also includes other frames that follow key frames A, B, and C, shown as "A frames" (AFs), "B frames" (BFs), and "C frames" (CFs), respectively. These other frames may be encoded using differential encoding based on the respective key frames, among other approaches.

Once shot analyzer 200 has generated encoded video sequence 180(K) and corresponding key frames, shot analyzer 200 then marks the location of each key frame to be used while processing the resolution of another encoded video sequence 180, and ensures that key frames are inserted in the same temporal location into that other sequence. For example, shot analyzer 200 could mark key frame A such that when processing the video sequence in 1280×720 resolution key frame A' is generated and included in shot sequence 220(0)'. Shot analyzer 200 performs this process for all key frames A, B, and C to populate encoded video sequence 180(1) with key frames A', B', and C' and populate encoded video sequence 180(0) with key frames A", B", and C".

Because shot analyzer 200 generates all of the different key frame encodings based on just one encoded video sequence (encoded video sequence 180(K)), each version of a given key frame is aligned with the other versions. For example, key frames A, A', and A" are aligned with one another. Likewise, key frames B, B', and B" are aligned with one another. However, because shot analyzer 200 generates key frames at shot boundaries, which occur irregularly, the key frames included in a given encoded video sequence 180 do not follow a strict cadence as would typically be found in conventional encodings. For example, key frames A and B (as well as A' and B', and A" and B") are separated by a number 230 of frames, while key frames B and C (as well as B' and C', and B" and C") are separated by a number 232 of frames.

One advantage of the encoding technique described herein is that during playback, a video player may perform adaptive streaming with encoded video sequences 180 and switch between each encoded version at key frame intervals. Because key frame intervals correspond to shot boundaries, changes in resolution may be less detectable by the viewer, potentially resulting in higher viewer engagement. FIG. 2B illustrates how encoding engine 160 performs another encoding technique.

FIG. 2B illustrates how the encoding engines of FIG. 1B generate encoded video sequences with mixed resolutions, according to various embodiments of the present invention. As shown, shot analyzer 200 processes source video sequence 170 to generate encoded video sequences 180(K), 180(K)', and 180(K)". Encoded video sequence 180(K) is a low resolution encoding of source video sequence 170 (as also shown in FIG. 2A). Encoded video sequences 180(K)' and 180(K)" are mixed resolution encodings. Shot analyzer 200 generates encoded video sequence 180(K)' based on encoded video sequence 180(K) and generates encoded video sequence 180(K)" based on encoded video sequence 180(K)'.

To generate encoded video sequence 180(K)', shot analyzer 200 processes encoded video sequence 180(K) and assigns a quality metric to each of shot sequences 220(0) through 220(2). Shot analyzer 200 assigns quality metrics using either fast Fourier transform (FFT) 240 or harmonic VMAF (VMAFh) 250 or any other feasible technique. These specific metrics are described in greater detail below.

Shot analyzer 200 analyzes the quality metrics for each shot sequence 220 and then determines which shot sequence 220 has the lowest quality. In the example shown, shot sequence 220(1) has the lowest quality. To generate encoded video sequence 180(K)', shot analyzer 200 re-encodes shot sequence 220(1) to a higher resolution to produce shot sequence 220(1)'. Shot analyzer 200 may re-encode a portion of source video sequence 170 to generate shot sequence 220(1)'. In this manner, shot analyzer 200 generates encoded video sequence 180(K)' to include shot sequences 220(0) and 220(2) encoded at 256×144, and shot sequence 220(1)' encoded at 1280×720.

Shot analyzer 200 performs a similar process to generate encoded video sequence 180(K)". In particular, shot analyzer 200 generates a quality metric for each shot sequence included in encoded video sequence 180(K)'. Shot analyzer 200 then identifies that shot sequence 220(2) has the lowest quality metric, and re-encodes that sequence for inclusion into encoded video sequence 180(K)". As shown, encoded video sequence 180(K)" includes shot sequences 220(0), 220(1)', and 220(2)'.

Shot analyzer 200 may perform the above approach for any number of different iterations, thereby creating any number of different encoded video sequences 180. Each such sequence may include at least one shot sequence 220 with increased resolution compared to a corresponding shot sequence 220 included in a previously generated encoded video sequence 180.

In addition, shot analyzer 200 may also perform a reverse of the process described above to iteratively downsample specific shot sequences 220 having a quality metric that exceeds a threshold. For example, shot analyzer 200 could analyze encoded video sequence 180(K)" and determine that the quality metric of shot sequence 220(2)' exceeds a quality threshold. Shot analyzer 200 would then downsample shot sequence 220(2)' to 256×144 to generate shot sequence 220(2). In one embodiment, after shot analyzer 200 generates key frames based on a low resolution encoding of source video sequence 170, as discussed above, shot analyzer 200 then generates a high resolution encoding and performs the aforementioned downsampling approach iteratively. In doing so, shot analyzer 200 may generate multiple successive encoded video sequences 180 having at least one shot sequence 220 with a lower resolution than a previously generated encoded video sequence 180.

The approaches described above may also be adapted to upgrade or downgrade the resolution of multiple shot sequences 220 within a given encoded video sequence 180 during just one iteration. For example, and as discussed in greater detail below, shot analyzer 220 could map the quality metrics associated with each shot sequence 220 in a particular encoded video sequence 180 to a different threshold, and then re-encode each of those shot sequences 220 to a new resolution associated with the corresponding threshold. This particular approach could be implemented with either FFT 240 or VMAFh 250.

Although any technically feasible quality metric may be implemented to perform the process described above, techniques involving quality metrics based on FFT 240 and VMAFh 250 are presented here for clarity.

To generate a quality metric for a given shot sequence 220 using FFT 240, shot analyzer 200 first computes the frequency spectrum for each frame included in that shot sequence. Shot analyzer 200 then determines the amount of high frequency energy included in the frequency spectrum and generates a quality metric that reflects that amount of energy. For example, shot analyzer 200 could generate a metric that reflects the amount of energy included in the frequency spectrum that exceeds a high-frequency noise threshold. Excessive high frequency energy may be indicative of a high spatial-quality sequence. Accordingly, the quality metric generated in this manner can be used to identify and re-encode those shot sequences 220.

In one embodiment, for any given shot sequence 220 included in a particular encoded video sequence 180, shot analyzer 200 compares the amount of high frequency energy included in the shot sequence 220 to a set of increasing thresholds that map to a set of increasing resolutions. When the amount of high frequency energy in the shot sequence 220 exceeds a specific threshold but not subsequent thresholds, shot analyzer 200 then encodes that shot sequence to the resolution associated with the specific threshold. By performing this technique across all shot sequences 220 in the particular encoded video sequence 180, shot analyzer 200 can generate, in a single pass, another encoded video sequence 180 with shot sequences 220 having many different resolutions. In addition, those resolutions are optimized to have consistent quality relative to the FFT-based metric. Shot analyzer 200 may also apply an analogous technique to downsample shot sequences that lack high frequency energy, thereby conserving bandwidth.

To generate a quality metric for a given shot sequence 220 using VMAFh 250, shot analyzer 200 first computes the linear VMAF (VMAFn) for that shot sequence. Techniques for computing linear VMAF are known in the art and omitted for clarity. Shot analyzer 200 then computes VMAFh for the shot sequence 220 by evaluating Equation 1:

$$VMAF_{harmonic} = \frac{N}{\sum_{n=0}^{N-1} \frac{1}{1+VMAF_n}} - 1 \qquad \text{Equation 1}$$

Equation 1 assumes a shot sequence duration of N frames, indexed between 0 and N−1 (inclusive). VMAFn is the individual VMAF score for frame n, which takes values in the range [0,100]. Shot analyzer 200 computes the final VMAFh score for a shot sequence to also have a value in the range [0,100].

Shot analyzer 200 may compute VMAFh for multiple (J) shot sequences, each sequence having a separate VMAFh(j) score, evaluated over a duration of N(j) frames. The final VMAFh score for the sum of all N(j) frames, from j=0 to J−1 can obtained by aggregating in a similar fashion the VMAFh (j) scores for all J shot sequences via an adapted form of Equation 1. For example, the numerator of Equation 1 could include the sum across N(j) frames, and the denominator could include a sum across N(j) divided by 1+VMAFh(j). Other adapted forms of Equation 1 may also exist, as well. As a general matter, shot analyzer 200 is configured to generate VMAFh scores at the shot sequence level, and then aggregate those scores across multiple shot sequences to generate a VMAFh score for an entire encoded video sequence.

Once shot analyzer 200 generates a VMAFh score for each shot sequence 220 in a given encoded video sequence 180, shot analyzer 200 then identifies the shot sequence 220 with the lowest VMAFh. Shot analyzer 200 then re-encodes the identified shot sequence 220 to a higher resolution or lower quantization parameter, which yields higher image quality, to generate another encoded video sequence 180. In doing so, shot analyzer 200 may re-encode a portion of source video sequence 170 corresponding to that shot sequence.

In one embodiment, for any given shot sequence 220 included in a particular encoded video sequence 180, shot analyzer 200 compares the VMAFh score computed for the shot sequence 220 to a set of increasing thresholds that map to a set of increasing resolutions. When the VMAFh score for a given sequence 220 exceeds a specific threshold but not subsequent thresholds, shot analyzer 200 then encodes that shot sequence to the resolution associated with the specific threshold. By performing this technique across all shot sequences 220 in the particular encoded video sequence 180, shot analyzer 200 can generate, in a single pass, another encoded video sequence 180 with shot sequences 220 having many different resolutions. In addition, those resolutions are optimized to have consistent quality relative to the VMAFh metric. Shot analyzer 200 may also apply an analogous technique to downsample shot sequences with high VMAFh scores, thereby conserving bandwidth.

As mentioned, any technically feasible quality metric can be implemented to generate mixed resolution encodings with, on average, increasing resolution. During playback, a video player may switch between these different encodings at shot boundaries via the associated key frames. With mixed resolution encodings, the video player can more precisely optimize quality and/or distortion for a given available bit rate, thereby improving adaptive streaming. Yet another technique for generating ensembles of mixed resolution encodings is discussed below in conjunction with FIG. 2C and also in conjunction with FIGS. 3-12.

FIG. 2C illustrates how the encoding engines of FIG. 1B cut a video sequence into shot sequences, according to various embodiments of the present invention. As shown, shot analyzer 200 is configured to process source video sequence 170 to generate shot sequences 220(0) through 220(P). In the example shown, source video sequence 170 includes frames of video having a 4096×2048 resolution, meaning a 4096 pixel width by 2048 pixel height. The resolution of source video sequence 170 generally corresponds to the particular distribution format associated with the video sequence.

Shot analyzer 200 generates each shot sequence 220 to have the same resolution as source video sequence 170. However, each shot sequence 220 includes a different sequence of video frames that corresponds to a different shot. Prior to generating shot sequences 220, shot analyzer 200 may remove extraneous pixels from source video sequence 170, as mentioned previously. For example, shot analyzer 200 may remove pixels included in black bars along border sections of source video sequence 170. Upon parsing source video sequence 170 into shot sequences 220, encoding engine 160 processes each shot sequence 220 to generate a different dataset, as described below in conjunction with FIG. 3.

Figure 3:
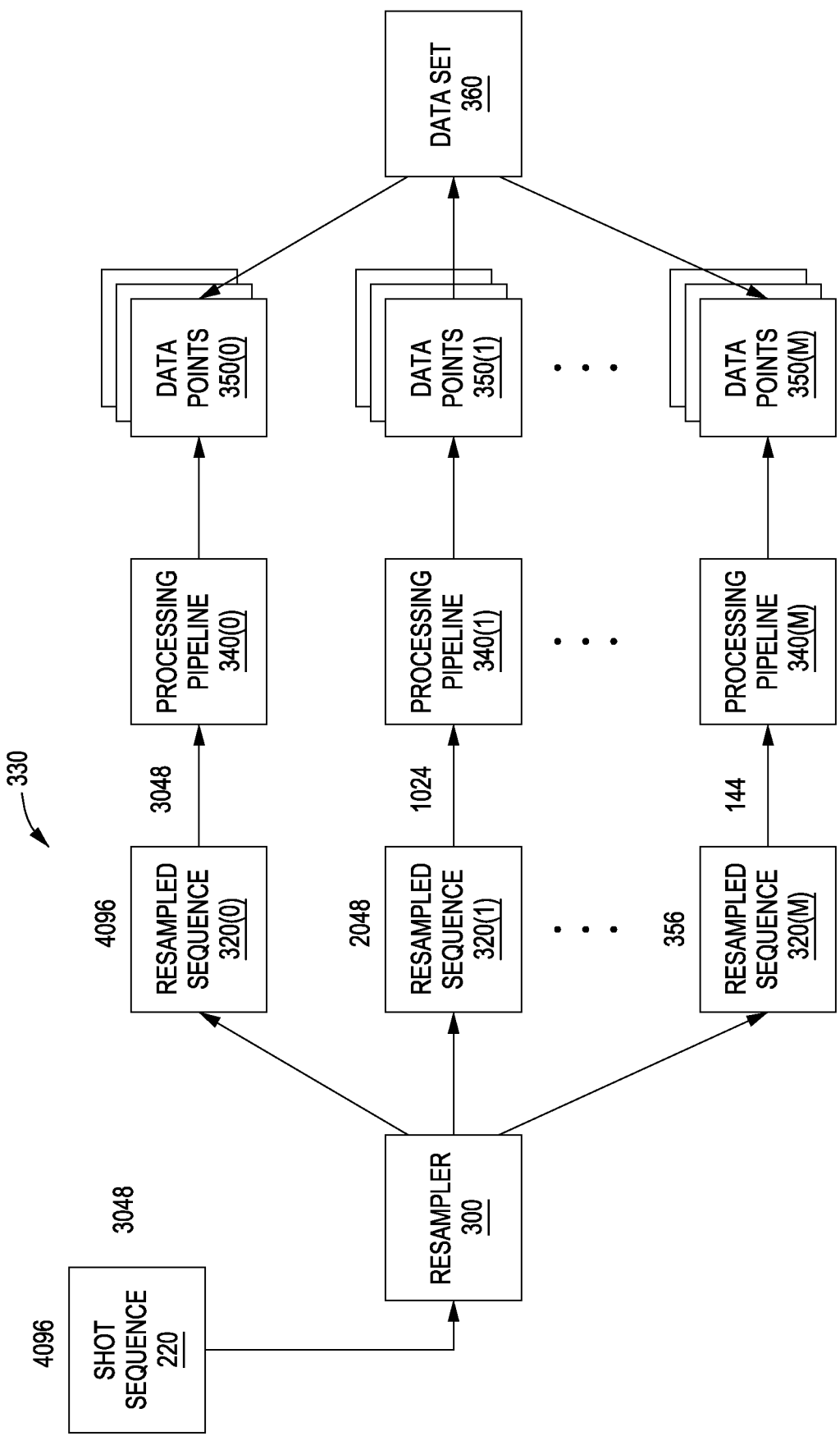
FIG. 3 illustrates how the encoding engines of FIG. 1B process the shot sequences of FIG. 2 to generate a dataset, according to various embodiments of the present invention.

FIG. 3 illustrates how the encoding engines of FIG. 1B process the shot sequences of FIG. 2 to generate a dataset, according to various embodiments of the present invention. As shown, a resampler 300 processes a shot sequence 220 to generate resampled sequences 320(0) through 320(M). Each resampled sequence 320 has a different resolution, as is shown. Resampled sequence 320(0) has a resolution of 4096×2048, resampled sequence 320(1) has a resolution of 2048×1024, and resampled sequence 220(M) has a resolution of 256×144. The set of resampled sequences 320 corresponds to a resolution ladder 330 that is associated with the shot sequence 220.

Resampler 300 may generate resolution ladder 330 to include any distribution of resolutions. In practice, however, resampler 300 first generates resampled sequence 320(0) to have the same resolution as shot sequence 220 (or source video sequence 170), and then generates each subsequent resampled sequence 320(1) onwards to have a resolution that is a constant fraction of the previous resolution. In practice, the ratio between the resolution of a given resampled sequence 320(H) and a previous resampled sequence 320(H−1) is approximately 1.5.

However, in various embodiments a denser resolution ladder may be used, i.e. with a ratio between the resolution of a given resampled sequence 320(H) and a previous resampled sequence 320(H−1) of less than 1.5, such as 1.414 or 1.26, or a coarser resolution ladder, i.e. with a ratio between the resolution of a given resampled sequence 320(H) and a previous resampled sequence 320(H−1) of more than 1.5, such as 2.0 or 3.0. The density of resolution ladder 330 can also depend on the characteristics of the video shot, such that it can span the desired quality levels uniformly. Additional constraints, such as the amount of CPU one wants to spend in encoding a certain sequence, can be used to decide the density of resolution ladders.

Upon generating resolution ladder 330, encoding engine 160 then executes a set of parallel processing pipelines 340 to process each different resampled sequence 320. Each processing pipeline 340 generates, based on the resampled sequence 320 input thereto, a collection of data points 350. Processing pipeline 340(0) generates data points 350(0), processing pipeline 350(1) generates data points 350(1), and so forth for all processing pipelines 340. Encoding engine 160 then combines all such data points 350 to generate a data set 360. Because encoding engine 160 performs this processing for all shot sequences 220(0) through 220(P), encoding engine 160 generates P different datasets 360. An exemplary processing pipeline 340 is described in greater detail below in conjunction with FIG. 4, and data set 360 is described further in conjunction with FIGS. 5A-5B.

FIG. 4 is a more detailed illustration of the processing pipeline of FIG. 3, according to various embodiments of the present invention. As shown, processing pipeline 340 receives a resampled sequence 320 and generates, via a set of parallel sub-pipelines 450(0) through 450(L), data points 350. Each sub-pipeline 450 includes an encoder 400, a decoder 410, an upsampler 420, and a metric analyzer 430. Sub-pipeline 450(0) includes encoder 400(0), decoder 410(0), upsampler 420(0), and metric analyzer 430(0), sub-pipeline 450(1) includes encoder 400(1), decoder 410(1), upsampler 420(1), and metric analyzer 430(1), and so forth for all sub-pipelines 450. Encoders 400 and decoders 410 within each sub-pipeline 450 may implement any technically feasible encoding/decoding algorithm(s), including advanced video coding (AVC), high-efficiency video encoding (HEVC), or VP9, among others.

During execution of processing pipeline 340, each encoder 400(0) through 400(L) first encodes resampled sequence 320 with a different quantization parameter (QP). Encoder 400(0) encodes resampled sequence 320 with QP=0, encoder 400(1) encodes resampled sequence 320 with QP=1, and encoder 400(L) encodes resampled sequence 320 with QP=L. Generally, the number of encoders L corresponds to the number of available QPs for the given algorithm implemented by encoders 400. In embodiments where encoders 400 implement AVC encoding algorithm using the x264 implementation, encoders 400 may perform the encoding operation described using different constant rate factors (CRFs) instead of QPs. In various embodiments, encoders 400 may vary any encoding parameter beyond QP or CRF.

Importantly, the encoded resampled sequences generated by encoders 400 may ultimately be included within encoded video sequence 180 shown in FIG. 2B. In the context of this disclosure, these encoded, resampled sequences may be referred to herein as "chunks." A "chunk" generally includes a sequence of video frames encoded with a particular set of encoding parameters. In practice, each chunk is resampled with a particular resolution and then encoded with a given QP. Also, each chunk is generally derived from a given shot sequence. However, persons skilled in the art will understand that a "chunk" in the context of video encoding may represent a variety of different constructs, including a group of pictures (GOP), a sequence of frames, a plurality of sequences of frames, and so forth.

Once encoders 400 encode resampled sequences 320 with the different QPs in the manner described, each sub-pipeline 450 proceeds in relatively similar fashion. Decoders 410 receive the encoded sequences and then decode those sequences. Accordingly, each video sequence output via upsamplers 420(0) through 420(L) has the same resolution. However, those video sequences may have different qualities by virtue of being encoded with different QPs.

In one embodiment, upsamplers 420 upsample the decoded sequences to target resolutions that may be relevant to the display characteristics of a class of endpoint devices. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The decoded sequences can be upsampled to all these target resolutions in order to assess quality, when considering one of these different classes of endpoint devices, correspondingly.

Metric analyzers 330 analyze the upsampled sequences to generate an objective quality metric (QM) for each sequence. Metric analyzers 330 could implement, for example, a VMAF (or harmonic VMAF) algorithm to generate a VMAF score for each upsampled sequence, among other possibilities. Although a multitude of video quality metrics, such as VMAF scores, can be calculated at different target resolutions, it should be clear that, when comparing qualities among encodes performed at different resolutions, one needs to use the same target resolution for resampling, after decoding. In the following discussion, we consider one such resolution for upsampling and quality metric calculation, for example the common HD resolution of 1920×1080.

Each metric analyzer 330 then generates a different data point 440 that includes the resolution of resampled sequence 320, the QP implemented by the respective encoder 400, and the computed QM. Thus, for each different QP, processing pipeline 340 generates a separate data point, shown as data point 440(0) through 440(L). Importantly, each data point 440 corresponds to a particular resampled/encoded version of a given shot sequence 220. As described in greater detail below, encoding engine 160 selects resampled/encoded versions of each shot sequence 220 for inclusion into encoded video sequences 180 based on the associated data points 400. Processing pipeline 340 collects all such data points 440 into data points 350, as also shown in FIG. 3.

Referring back now to FIG. 3, encoding engine 160 generates a different set of data points 350(0) through 350(M) for each different resampled sequence 320(0) through 320(M), and then collects these data points 350 to data set 360. Accordingly, data set 360 includes M*L data points, because encoder 160 generates a data point in data set 360 for each combination of the M different resampled sequences 320 and the L different QPs. One does not necessarily need to use the same number of QPs or the same QP values for each resolution, but instead use a fully customized number of QPs and QP values that is suitable for each shot. Encoding engine 160 then performs a processing operation discussed below in conjunction with FIGS. 5A-5B to identify the particular data points within data set 360 that minimize distortion and/or bitrate.

Convex Hull Analysis

FIG. 5A is a graph of bitrate versus quality that is generated based on the dataset of FIG. 3, according to various embodiments of the present invention. As shown, a graph 500 includes a bitrate axis 510 and a quality metric (QM) axis 520. Graph 500 also includes quality curves 502, 504, and 506 plotted against bitrate axis 510 and QM axis 520. Each curve shown corresponds to a different resolution encoding for a particular shot sequence 220 and therefore may be derived from a particular set of data points 350, where each data point 440 in a given set corresponds to a particular combination of resolution, QP, and QM. Encoding engine 160 generates the data points included in curves 502, 504, and 506 by converting the resolution of each data point 440 to a given bitrate. Encoding engine 160 could, for example, divide the total number of bits needed for the given resolution by the length of the associated shot sequence 320.

Encoding engine 160 is configured to reprocess dataset 160 plotted in FIG. 5A to replace QM with a distortion metric. Encoding engine 160 may compute a given distortion metric by inverting a QM value, subtracting the QM value from a constant value, or performing other known techniques for converting quality to distortion. Encoding engine 160 then generates a convex hull based on the converted values, as discussed below in conjunction with FIG. 5B.

FIG. 5B is a graph of convex hull data points that is generated based on the dataset of FIG. 3, according to various embodiments of the present invention. As shown, graph 550 includes bitrate axis 560 and distortion axis 570. Encoding engine 160 plots distortion curves 552, 554, and 556 against bitrate axis 560 and distortion axis 570. Then, encoding engine 160 computes convex hull points 580 by identifying points across all curves that form a boundary where all points reside on one side of the boundary (in this case, the right side of the boundary) and also are such that connecting any two consecutive points on the convex hull with a straight line leaves all remaining points on the same side. In this manner, encoding engine 160 may generate convex hull points 580 for each shot sequence 220. Persons skilled in the art will understand that many techniques for generating convex hulls are well known in the field of mathematics, and all such techniques may be implemented to generate convex hull 580. In one embodiment, encoding engine 160 applies machine learning techniques to estimate convex hull points 580 based on various parameters of the associated source video sequence 170. In this manner, some of the computations discussed thus far may be streamlined and/or avoided entirely. Encoding engine 160 performs the processing described in conjunction with FIGS. 5A-5B via a sequence of processing stages discussed below in conjunction with FIG. 6.

FIG. 6 illustrates how the encoding engines of FIG. 1B generate the convex hull data points of FIG. 5B, according to various embodiments of the present invention. As shown, a distortion converter 600 and convex hull analyzer 620 cooperatively process dataset 360 to generate convex hull points 580. In operation, distortion converter 600 receives data set 360 and then converts the QM values included in that dataset to distortion values. Then, convex hull analyzer 620 computes the convex hull for the dataset 360 to generate convex hull points 580.

In this manner, encoding engine 160 computes convex hull points 580 for each shot sequence 320 based on the associated dataset 360. Thus, encoding engine 160 generates P sets of convex hull points 580 based on the P different shot sequences 320. Again, each set of convex hull points 580 includes data points that describe, for one shot sequence, the distortion and bitrate for a particular resampled, encoded version of the shot sequence. That version is resampled with a given resolution and encoded with a given QP. Encoding engine 160 collects all convex hulls 580 generated for all P shot sequences 320 and then performs additional processing to generate encoded video sequences 180, as described in greater detail below in conjunction with FIG. 7.

Assembling Encoded Video Sequences Via Trellis Iteration

Figure 7:
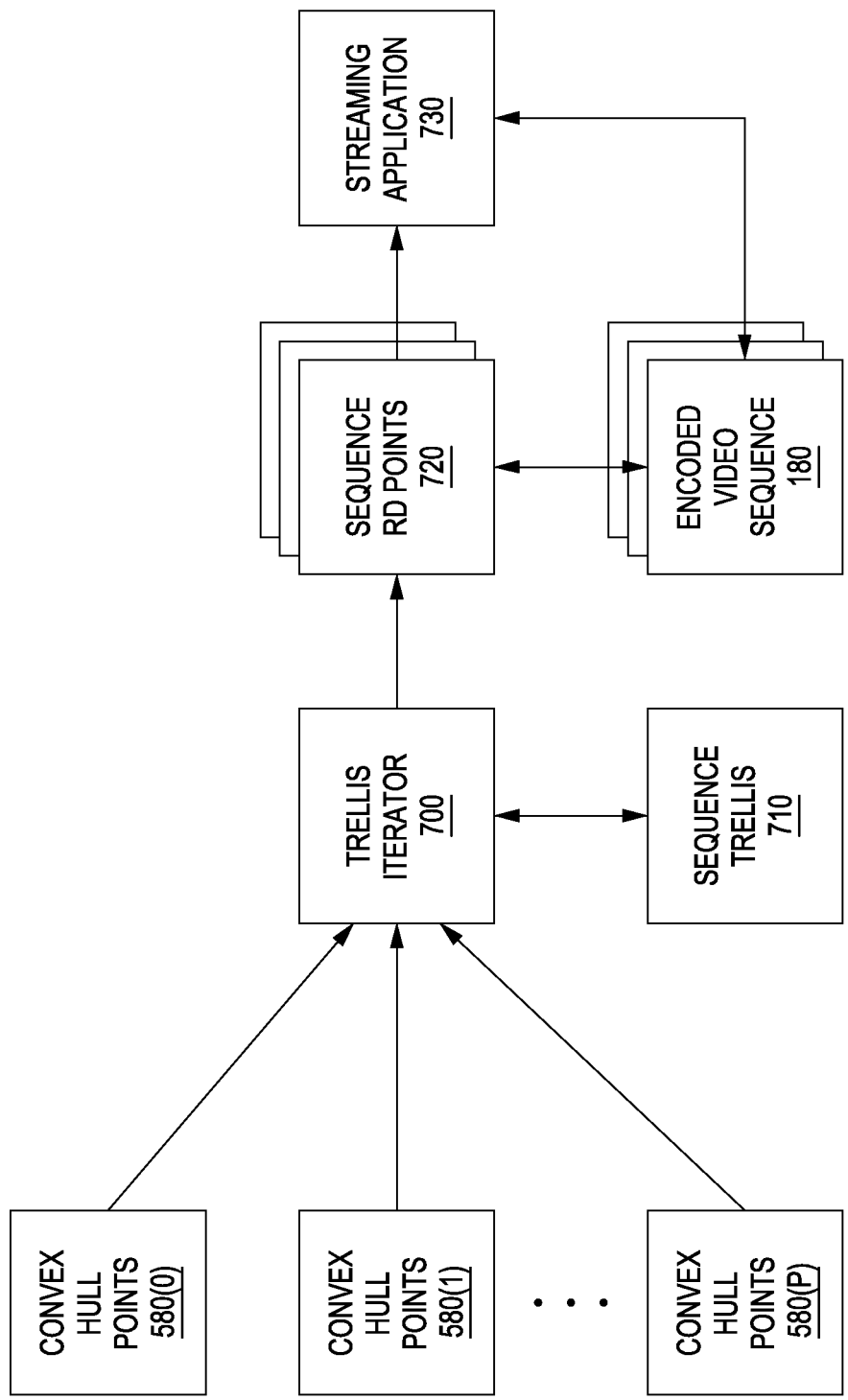
FIG. 7 illustrates how the encoding engines of FIG. 1B generate different versions of the video sequence of FIG. 2 using a plurality of convex hulls, according to various embodiments of the present invention.

FIG. 7 illustrates how the encoding engines of FIG. 1B generate different versions of the video sequence of FIG. 2 using a plurality of convex hulls, according to various embodiments of the present invention. As shown, a trellis iterator 700 receives convex hull points 580(0) through 580(P) and then iteratively updates a sequence trellis 710 to generate sequence RD points 720. Trellis iterator 700 is a software module included within encoding engine 160. Sequence trellis 710 is a data structure that is described in greater detail below in conjunction with FIGS. 8A-8D. Sequence RD points 720 include bitrate-distortion (RD) points generated for different combinations of resampled, encoded sequences.

Each sequence RD point 720 corresponds to a different encoded video sequence 180. Each encoded video sequence 180 includes a different combination of the resampled, encoded shot sequences discussed above. A streaming application 730 is configured to stream encoded video sequences 180 to an endpoint device based on sequence RD points 720. Each encoded video sequence 180 minimizes distortion (on average) across all shot sequences in the video sequence for a given average bitrate associated with the video sequence, as also discussed in greater detail below in conjunction with FIG. 9. Trellis iterator 700 generates these different sequences using a technique described in greater detail below.

FIGS. 8A-8D illustrate in greater detail how the encoding engines of FIG. 1B assemble chunks of video content into an encoded video sequence, according to various embodiments of the present invention. As shown in FIGS. 8A-8D, a sequence trellis 710 includes a shot axis 800 and a bitrate axis 810. Sequence trellis 710 also includes columns of convex hull points 580, where each column corresponds to a particular shot sequence. For example, the zeroth column included in sequence trellis 710 corresponds to convex hull points 580(0). Hull points within any column are ranked according to ascending bitrate (and, by construction, descending distortion). Hull points are also guaranteed to have negative slopes that—in magnitude—are decreasing as a function of bitrate.

For convenience, convex hull points 580 are individually indexed according to the following system. For a given point, the first number is an index of the shot sequence, and the second number is an index into the bitrate ranking of those hull points. For example, convex hull point 00 corresponds to the zeroth shot sequence and the zeroth ranked bitrate (in this case the lowest bitrate). Similarly, convex hull point 43 corresponds to the fourth shot sequence and the third ranked bitrate (in this case the highest ranked bitrate).

Each convex hull point included within trellis 710 corresponds to a different resampled, encoded version of a shot sequence 220, as described. Encoding engine 160 generates encoded video sequences 180 shown in FIG. 2B by combining these resampled, encoded versions of shot sequences 220. Encoding engine 160 implements sequence trellis 710 to iteratively perform this combining technique.

Figure 8B:
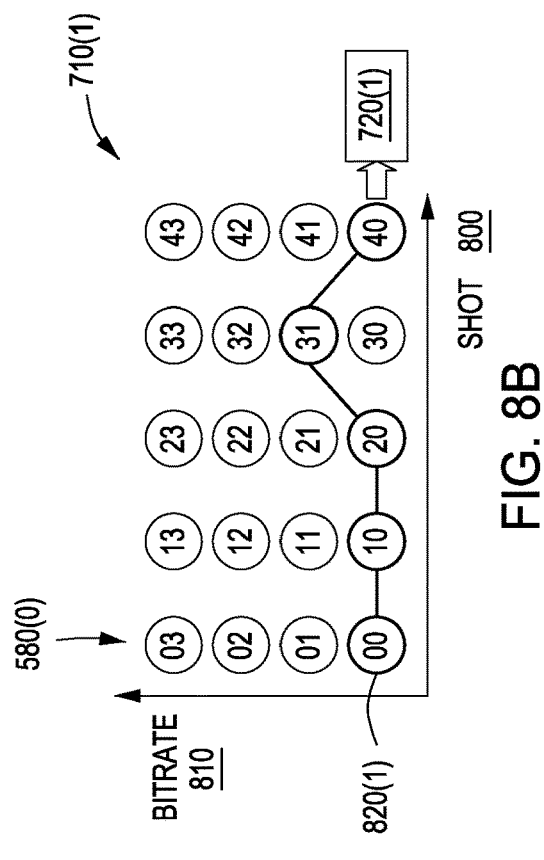
FIGS. 8A-8D illustrate in greater detail how the encoding engines of FIG. 1B assemble chunks of video content into an encoded video sequence, according to various embodiments of the present invention.
Figure 8D:
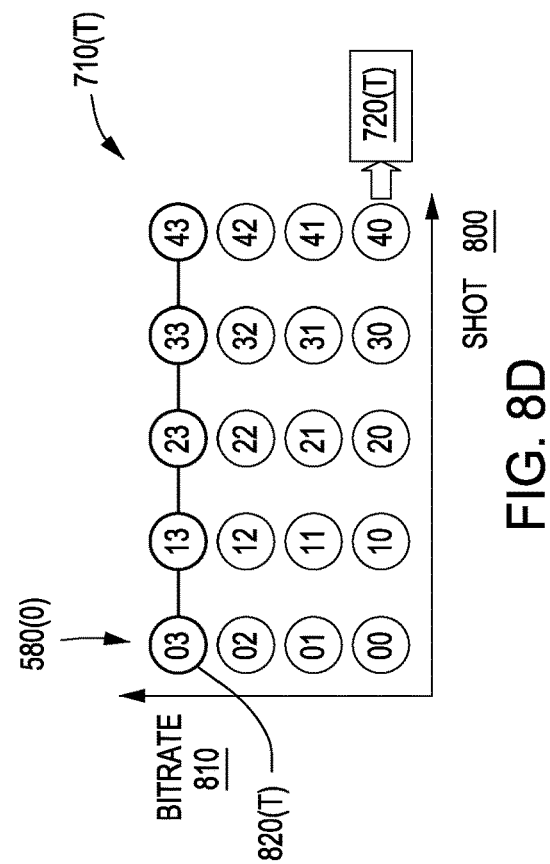
Figure 8A:
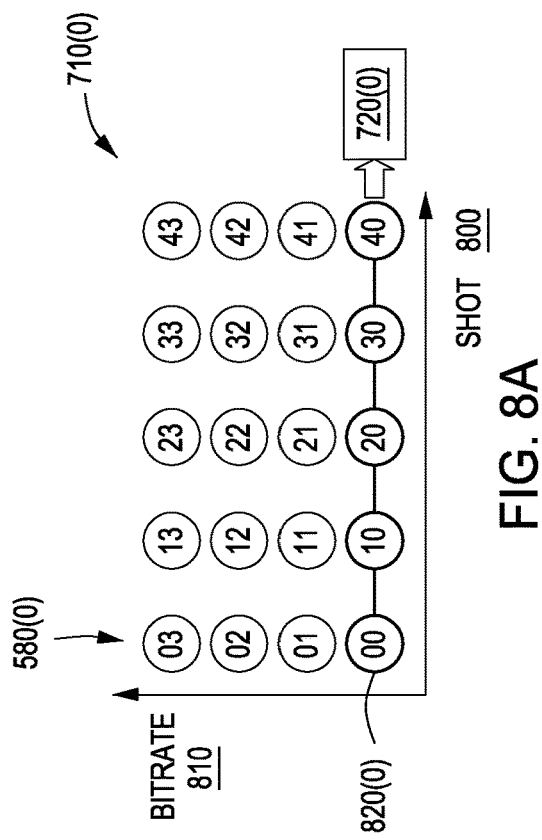

Each of FIGS. 8A-8D illustrates a different version of sequence trellis 710 generated by trellis iterator 700 at a different iteration. FIG. 8A illustrates sequence trellis 710(0) in an initial state. Here, trellis iterator 700 generates sequence 820(0) of convex hull points that includes hull points 00, 10, 20, 30, and 40. These initially selected hull points have the lowest bitrate encoding and highest distortion, and therefore reside at the bottom of the respective columns. Based on sequence 820(0), trellis iterator 700 generates an encoded video sequence 180 that includes the resampled, encoded shot sequences 220 associated with each of convex hull points 00, 10, 20, 30, and 40. Trellis iterator 700 also generates sequence RD point 720(0) based on that encoded video sequence 180.

Trellis iterator 710 then computes, for each convex hull point within sequence 820(0), the rate of change of distortion with respect to bitrate between the convex hull point and the above-neighbor of the convex hull point. For example, trellis iterator 710 could compute the rate of change of distortion with respect to bitrate between nodes 00 and 01, 10 and 11, 20 and 21, 30 and 31, and 40 and 41. The computed rate of change for the convex hull point associated with a given resampled, encoded shot sequence 220 represents the derivative of the distortion curve associated with that shot sequence, taken at the convex hull point.

Trellis iterator 710 selects the derivative having the greatest magnitude, and then selects the above neighbor associated with that derivative for inclusion in a subsequent sequence 820. For example, in FIG. 8B, trellis iterator 700 determines that the derivative associated with convex hull point 30 is greatest, and therefore includes convex hull point 31 (the above-neighbor of convex hull point 30) in sequence 820(1). Based on sequence 820(1), trellis iterator 700 generates an encoded video sequence 180 that includes the resampled, encoded shot sequences 220 associated with each of convex hull points 00, 10, 20, 31, and 40. Trellis iterator 710 then generates sequence RD point 720(1) based on that encoded video sequence 180. Trellis iterator 710 performs this technique iteratively, thereby ascending trellis 710, as shown in FIGS. 8C-8D.

Figure 8C:
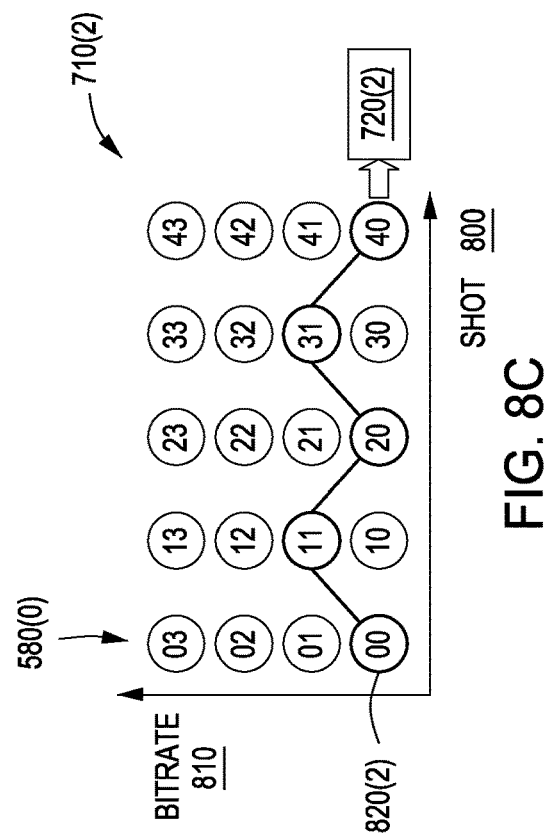

In FIG. 8C, trellis iterator 700 determines that the derivative associated with convex hull point 10 is greatest compared to other derivatives, and then selects convex hull point 11 for inclusion in sequence 820(2). Based on sequence 820(2), trellis iterator 700 generates an encoded video sequence 180 that includes the resampled, encoded shot sequences 220 associated with each of convex hull points 11, 10, 20, 31, and 40. Trellis iterator 700 also generates sequence RD point 720(2) based on that encoded video sequence 180. Trellis iterator 700 continues this process until generating sequence 820(T) associated with trellis iteration 710(T), as shown in FIG. 8D. In this manner, trellis iterator 700 incrementally improves sequences 820 by selecting a single hull point for which bitrate is increased and distortion is decreased, thereby generating a collection of encoded video sequences 180 with increasing bitrate and decreasing distortion.

In one embodiment, trellis iterator 700 adds convex hull points prior to ascending trellis 710 in order to create a terminating condition. In doing so, trellis iterator 700 may duplicate convex hull points having the greatest bitrate to cause the rate of change between the second to last and the last convex hull point to be zero. When this zero rate of change is detected for all shots, i.e. when the maximum magnitude of rate of change is exactly zero, trellis iterator 700 identifies the terminating condition and stops iterating.

Referring back now to FIG. 7, trellis iterator 700 generates encoded video sequences 180 that correspond to the sequences 820 shown in FIGS. 8A-8D via the trellis technique described above. Because trellis iterator 700 generates sequences 820 in an ascending manner to reduce distortion and increase bitrate, encoded video sequences 180 span a range from high distortion and low bitrate to low distortion and high bitrate. Each sequence RD point 720 provides the distortion and bitrate for a given encoded video sequence 180, and these sequence RD points 720 can be plotted to generate a convex hull, as discussed below in conjunction with FIG. 9.

Figure 9:
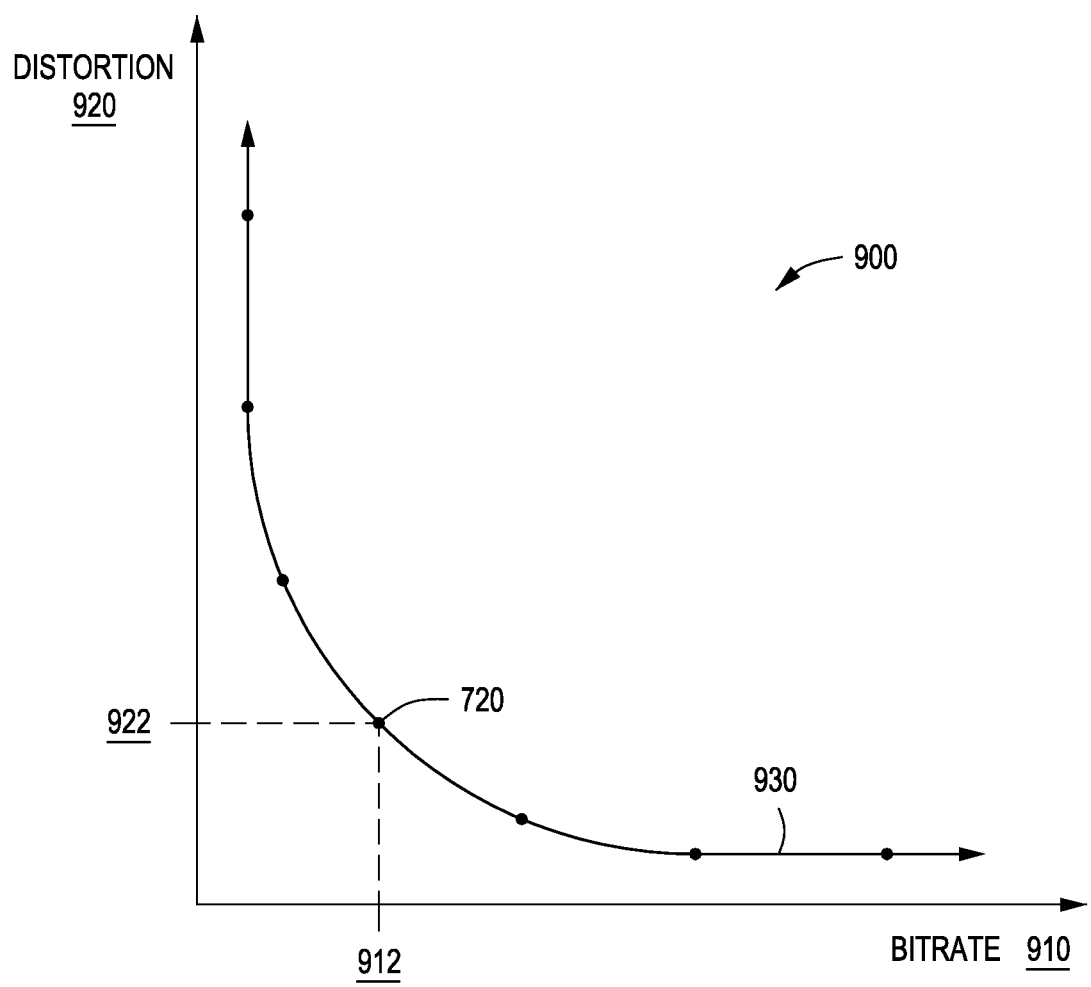
FIG. 9 is a graph of convex hull data points generated for the encoded video sequences shown in FIGS. 8A-8D, according to various embodiments of the present invention.

FIG. 9 is a graph of convex hull data points generated for the different versions of the video sequence shown in FIGS. 8A-8D, according to various embodiments of the present invention. As shown, a graph 900 includes a bitrate axis 910 and a distortion axis 920. Curve 930 is plotted against bitrate axis 910 and distortion axis 920. Curve 930 can be generated based on the collection of sequence RD points 720 corresponding to the encoded video sequences 180 generated via the trellis technique discussed above in conjunction with FIGS. 8A-8D. Accordingly, curve 930 represents distortion as a function of bitrate across all encoded video sequences 180. An exemplary sequence RD point 720 is shown, corresponding to a bitrate 912 and distortion 922.

Based on curve 930, streaming application 730 of FIG. 7 is capable of selecting, for a given available bitrate, the particular encoded video sequence 180 that minimizes distortion for that bitrate. Streaming application 730 may select a single encoded video sequence 180 during streaming, or dynamically select between video sequences. For example, streaming application 730 could switch between encoded video sequences 180 at shot boundaries. With this approach, streaming application 730 may deliver a consistent quality video experience to the end user without requiring excessive bandwidth.

In one embodiment, streaming application 730 selects between encoded video sequences 180 by applying one or more constraints that favor certain encoded video sequences over others. For example, one constraint could indicate that when switching from a first encoded video sequence 180 to a second encoded video sequence 180 to increase bitrate, resolution of the second encoded video sequence 180 must also increase. Constraints such as this may improve and/or optimize the process of selecting encoded sequences from curve 930 shown in FIG. 9.

Encoding engine 160 may implement variations on the technique described above in order to reduce storage and computational complexity. In one embodiment, encoding engine 160 implements a "constrained" version of the above approach. Referring now to FIG. 3, to implement the constrained version, encoding engine 160 only encodes resampled sequences 320 with a limited range of QP values. Accordingly, instead of generating versions of resampled sequence 320 for all possible QP values, encoding engine 160 may select a desired range of QP values and then only encode resampled sequence 320 for that range of QP values. Because higher QP values provide quality that is intolerably low, those higher QP values may be deemed unnecessary for encoding purposes. Likewise, because lower QP values require an unreasonable bitrate, those QP values may also be considered unnecessary. Accordingly, encoding engine 160 may constrain encoding to only the QP values that are likely to produce encodes that should actually be delivered to the end-user. In a further embodiment, encoding engine 160 fixes the number of different encodes generated per shot to a constant value. In situations where fewer encodes are generated for a given shot than the constant value, encoding engine 160 may replicate encodes in order to meet the constant value. In various embodiments, encoding engine 160 may limit the number of values for an encoding parameter used for encoding purposes in any technically feasible fashion.

For instance, encoding engine 160 may select a subset of possible values for the encoding parameter based on one or more efficiency-related criteria. For example, encoding engine 160 could select every other QP value, every third QP value, or every Nth QP value (where N is an integer that ranges from 2 to 10, inclusive) within a smaller range of QP values. In some alternate embodiments, statistics may be collected from multiple encodings of various shot sequences to determine the statistical probability that different QP values will be selected by encoding engine 160. Subsequently, the QP values that encoding engine 160 uses for encoding purposes may be limited based on the statistical probabilities. More specifically, encoding engine 160 may be constrained to use the QP values that encoding engine 160 is most likely to select based on the statistical probabilities.

In another embodiment, encoding engine 160 implements an "iterative" version of the above approach whereby encoding engine 160 performs multiple encoding passes to determine an encoding having a target bitrate or target distortion level. Initially, encoding engine 160 may perform a first pass using a constrained range of QP values such as that discussed above in conjunction with the "constrained" approach. Once encoding engine 160 has generated a convex hull of sequence RD points, such as that shown in FIG. 9, encoding engine 160 then identifies the sequence RD point closest to the target bitrate or target distortion level. Encoding engine 160 then identifies one or more nearby points on the convex hull and, based on the range of QPs associated with those points, performs additional encodes. In this manner, encoding engine 160 may iteratively refine the range of QPs used for encoding in order to target a particular bitrate or distortion.

In yet another embodiment, encoding engine 160 implements a "fixed quality" version of the above approach and limits the number of shot encodes that need to be stored and subsequently processed. With this approach, encoding engine 160 may produce shot encodes at predetermined, well-spaced quality intervals. Encoding engine 160 may then assemble these shot encodes into complete encoded video sequences 180 having a fixed quality across the entire sequence. The number of shot encodes implemented per shot sequence is a configurable parameter that represents tradeoff between quality and storage needs. In performing this technique, encoding engine 160 processes convex hull points 580 and then iteratively removes extraneous points until the remaining points represent the desired number of shot encodes. Encoding engine 160 could, for example, iteratively remove convex hull points 580 having the smallest gap relative to adjacent convex hull points 580. This technique allows encoding engine 160 to maximize the minimum quality of shot encodes.

In other embodiments, encoding engine 160 implements a "min-max optimization" version of the above approach. Encoding engine 160 selects a convex hull point for inclusion in a subsequent sequence 820 based on the distortion metrics or quality metrics instead of the derivative values. More precisely, encoding engine 150 determines the convex hull point included in sequence 820($x$) that has the maximum distortion metric (or maximum quality metric) and then includes the above-neighbor of the selected convex hull point for inclusion in the subsequent sequence 820($x$+1).

In related embodiments, when ascending sequence trellis 710 encoding engine 160 may trade off changes in slope between convex hull points 580 with actual quality value. In doing so, prior to selecting a convex hull point 580 for inclusion into a subsequent sequence, encoding engine 160 may filter out shot sequences (and corresponding convex hull points 580) with a quality metric below a given threshold (or distortion metric above a given threshold). Only after constraining the available shot sequences and convex hull points in this manner does encoding engine 160 generate a subsequent encoded video sequence 180 based on comparing slope values of the remaining convex hull points 580. This approach may maximize both average quality and minimum quality.

In alternate embodiments, encoding engine 180 and streaming application 730 may cause encoded video sequences 180 to be delivered to endpoint devices in any technically feasible fashion In the same or other embodiments, any amount and type of the functionality associated with encoding engine 180 and streaming application 730 may be implemented in or distributed across any number of host computers 110, any number of cloud computers 140, any number of client computers (not shown), and any number of endpoint devices, in any technically feasible fashion.

For instance, in some embodiments, encoding engine 180 configures streaming application 730 to deliver metadata to client applications executing on endpoint devices. Metadata includes, without limitation, metrics associated with encoded video content at any level of granularity, such as bitrates and quality metrics associated with one or more encoded shot sequences and/or encoded video sequences 180. The client applications may perform any type and amount of adaptive streaming operations based on the metadata in any technically feasible fashion.

In one scenario, a user configures a video player application to stream a movie to a laptop. Streaming application 190 transmits the metadata associated with four different encoded video sequences 180(1-4) to the video player application. The metadata indicates that encoded video sequence 180(4) is associated with the highest bitrate and the highest visual quality, while encoded video sequence 180(1) is associated with the lowest bitrate and the lowest visual quality. At any given time, the video player application selects the encoded video sequence 180 that provides the highest available visual quality during playback of the movie while avoiding playback interruptions due to rebuffering.

Based on an initial available bandwidth and the metadata, the video player application configures streaming application 730 to begin streaming encoded video sequence 180(4) to the video player application. In this fashion, the video player application provides the highest available visual quality during playback of the movie. In general, because of internet traffic, especially during peak times during the day, connection conditions can change quickly and become quite variable. In the described scenario, after ten minutes of playback, the available bandwidth decreases dramatically. Based on the reduced bandwidth and the metatdata, the video player application configures streaming application 730 to dynamically switch between encoded video sequence 180(4) and encoded video sequence 180(1). At the next shot boundary, streaming application 730 begins streaming encoded video sequence 180(1) instead of encoded video sequence 180(4) to the video player application. Although the video player application is no longer able to provide the highest available visual quality during playback of the movie, the video player application successfully avoids playback interruptions due to rebuffering.

Persons skilled in the art will understand that the techniques described thus far are applicable beyond video to audio as well. For example, the objective quality metric discussed above could provide a measure of audio quality. The remaining portions of the above techniques would proceed in otherwise similar fashion.

Procedures for Generating Encoded Video Sequences

Figure 10:
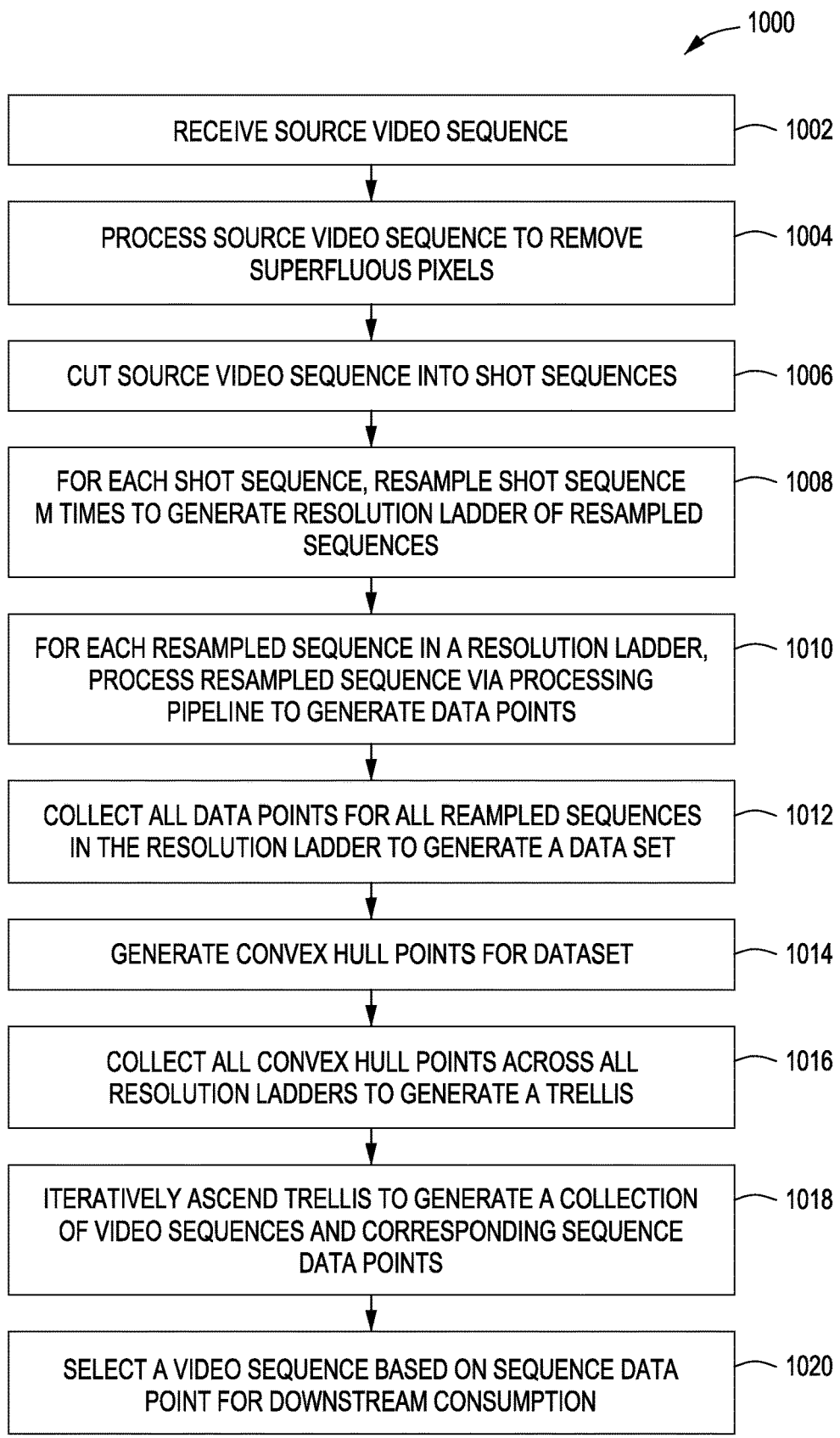
FIG. 10 is a flow diagram of method steps for assembling chunks of video content into an encoded video sequence, according to various embodiments of the present invention.

FIG. 10 is a flow diagram of method steps for assembling chunks of video content into an encoded video sequence, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1000 begins at step 1002, where encoding engine 160 receives source video sequence 170. Source video sequence 170 includes a sequence of frames encoded in a native or "distribution" format. At step 1004, encoding engine 160 processes source video sequence 170 to remove superfluous pixels. Such pixels may reside in horizontal or vertical black bars residing adjacent to the actual content of the video sequence. At step 1006, encoding engine 160 cuts source video sequence 170 into shot sequences 220. Each shot sequence 220 includes a subsequence of frames captured from a particular camera or simulated camera (in the case of computer animated sequences).

The method then proceeds to step 1008. At step 1008, for each shot sequence 220, encoding engine 160 resamples the shot sequence M times to generate a resolution ladder 330 of resampled sequences 320, as shown in FIG. 3. Each resampled sequence 320 has a different resolution. One resampled sequence 320 has the same resolution as the original video sequence.

The method then proceeds to step 1010. For each resampled sequence 320 in resolution ladder 330, encoding engine 160 processes the resampled sequence 320 via a processing pipeline 340 to generate data points 350. Specific processing steps executed by processing pipeline 340 are described in greater detail below in conjunction with FIG. 11. Each data point 350 indicates, for a given resampled sequence 320, the encoding resolution of the sequence, a quality metric for the sequence, and the QP value used to encode the sequence, as discussed in greater detail below in conjunction with FIG. 11.

At step 1012, encoding engine 160 collects all data points 350 for all resampled sequences 320 in resolution ladder 330 to generate a data set 360. Data set 360 corresponds to one shot sequence 220. Each data point in data set 360 corresponds to a different encoding and different resolution of the shot sequence. At step 1014, encoding engine 160 converts the quality metric associated with these data points to a distortion metric, and then generates convex hull points 580 for the dataset, as shown in FIG. 5B. Convex hull points 580 minimize distortion or bitrate across all resampled/encoded shot sequences.

At step 1016, encoding engine 160 collects all convex hull points 580 across all resolution ladders to generate a sequence trellis 710. The construction of an exemplary sequence trellis 710 is discussed in detail in conjunction with FIGS. 8A-8D. At step 1018, encoding engine 160 iteratively ascends the sequence trellis to generate a collection of encoded video sequences 180 and corresponding sequence RD points 720. An approach for ascending sequence trellis 710 is discussed in conjunction with FIG. 12.

At step 1020, streaming application 730 selects an encoded video sequence 180 for streaming based on the associated sequence RD point 720. In doing so, streaming application may select a particular sequence RD point 720 that minimizes distortion for a given available bitrate, and then stream the encoded video sequence 180 associated with that sequence RD point 720 to an endpoint device.

Figure 11:
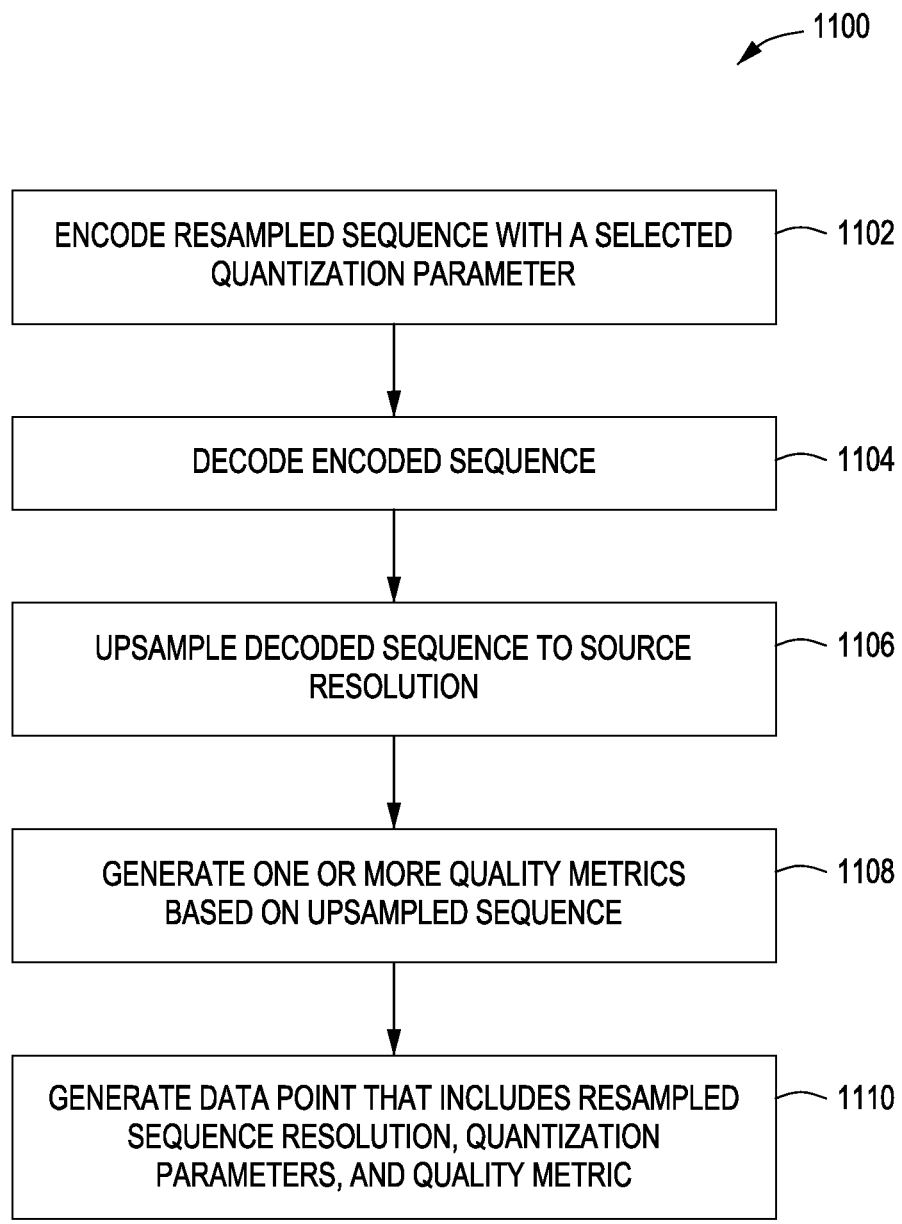
FIG. 11 is a flow diagram of method steps for processing a resampled shot sequence to generate a set of data points, according to various embodiments of the present invention.

FIG. 11 is a flow diagram of method steps for processing a resampled shot sequence to generate a set of data points, according to various embodiments of the present invention. Although the method steps are described in conjunction with the systems of FIGS. 1-9, persons skilled in the art will understand that any system configured to perform the method steps, in any order, is within the scope of the present invention.

Encoding engine 160 implements a method 1100 to perform processing associated with a given sub-pipeline 450 within a processing pipeline 340. Encoding engine 160 may execute multiple sub-pipelines 450 in parallel to implement a given processing pipeline 340, and may thus perform the method 1100 multiple times.

As shown, the method 1100 begins at step 1102, where encoding engine 160 encodes a resampled sequence 320 with a selected quantization parameter (QP). At step 1104, encoding engine 160 then decodes the encoded sequence and, at step 1106, upsamples the decoded sequence to the resolution associated with source video sequence 170. At step 1108, encoding engine 160 generates one or more quality metrics (QMs) for the upsampled sequence. At step 1110, encoding engine 160 generates a data point 440 that includes the resampled sequence resolution, the choice of quantization parameter (QP), and the quality metric (QM) generated for the encoded resampled video sequence.

Figure 12:
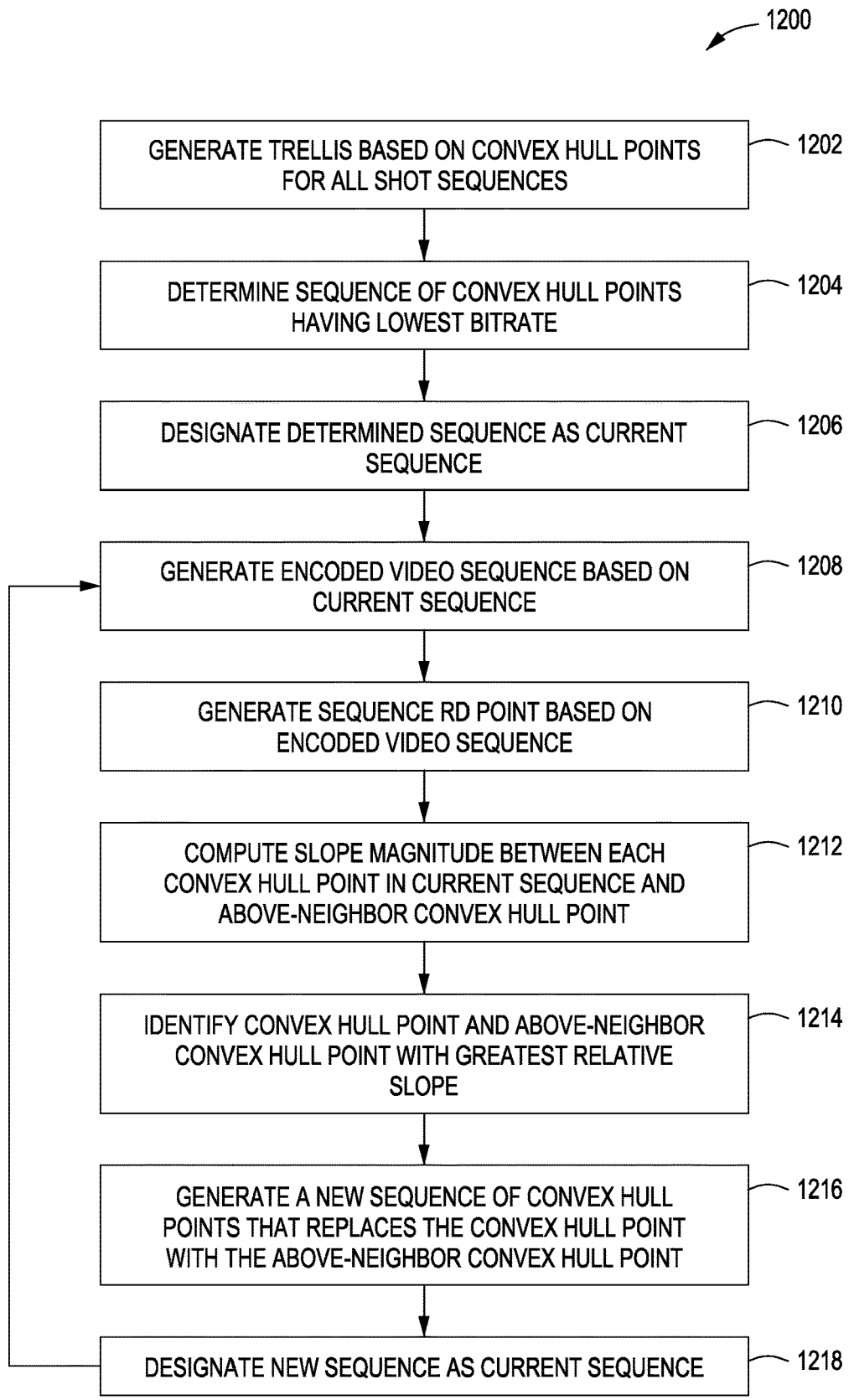
FIG. 12 is a flow diagram of method steps for generating a set of encoded video sequences, according to various embodiments of the present invention.

FIG. 12 is a flow diagram of method steps for generating a set of encoded video sequences, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1200 begins at step 1202, where encoding engine 160 generates a sequence trellis 710 based on convex hull points 580 for all shot sequences 220. Sequence trellis 710, as discussed above in conjunction with FIGS. 8A-8D, includes individual columns of convex hull points 580, where each column corresponds to a particular shot sequence. Accordingly, an encoded version of source video sequence 170 may be constructed by collecting one encoded, resampled shot sequence 220 from each such column.

At step 1204, encoding engine 160 determines a sequence of convex hull points 580 having the lowest bitrate. At step 1206, encoding engine 160 designates the determined sequence as the "current sequence." At step 1208, encoding engine generates an encoded video sequence based on the current sequence. In doing so, encoding engine 160 collects each resampled, encoded shot sequence 220 associated with the sequence of convex hull points 580 to construct an encoded version of the source video sequence 170. At step 1210, encoding engine 160 generates a sequence RD point 720 based on that encoded video sequence.

At step 1212, encoding engine 160 computes the magnitude of the slope between each convex hull point in the current sequence and the above-neighbor convex hull point. The "above-neighbor" of a given convex hull point resides immediately above the convex hull point and in the same column. At step 1214, encoding engine 160 identifies the convex hull point and above-neighbor convex hull point with greatest slope magnitude relative to one another. At step 1216, encoding engine 160 generates a new sequence of convex hull points that replaces the convex hull point with the above-neighbor convex hull point. Finally, at step 1218, encoding engine 160 designates the new sequence as the "current sequence" and returns to step 1208. Encoding engine 160 may repeat the method 1200 until generating an encoded sequence 170 with maximum bitrate compared to other sequences, or until another terminating condition is met.

In this manner, encoding engine 160 "climbs" sequence trellis 710 by determining subsequent versions of the current sequence that maximally reduce distortion and bitrate compared to other versions. By ascending sequence trellis 710 in this manner, encoding engine 160 need not consider all possible combinations of all resampled, encoded shot sequences (also referred to herein as "chunks"). Accordingly, encoding engine 160 may conserve considerable computing resources while still determining a spectrum of encoded video sequences that optimizes distortion for a range of bitrates.

Figure 13:
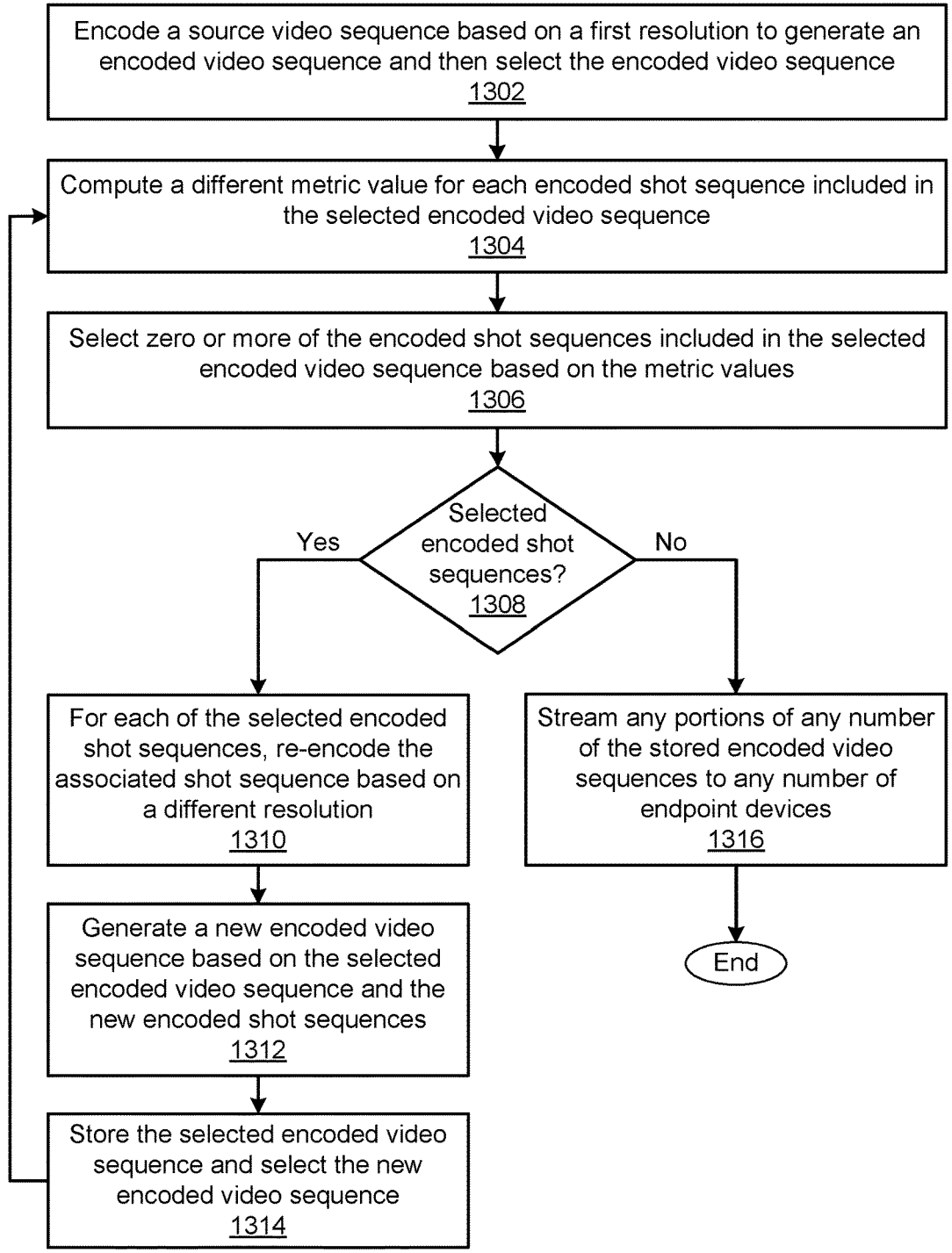
FIG. 13 is a flow diagram of method steps for varying resolution when generating a set of encoded video sequences, according to various other embodiments of the present invention.

FIG. 13 is a flow diagram of method steps for varying resolution when generating a set of encoded video sequences, according to various other embodiments of the present invention. Although the method steps are described in conjunction with the systems of FIGS. 1-9, persons skilled in the art will understand that any system configured to perform the method steps, in any order, is within the scope of the present invention.

As shown, a method 1300 begins at step 1302, where shot analyzer 200 encodes source video sequence 170 based on a first resolution included in a set of resolutions to generate initial encoded video sequence 180. Shot analyzer 200 then selects initial encoded video sequence 180. As part of step 1302, shot analyzer 200 generates a set of key frame locations based on initial encoded video sequence 180. At step 1304, shot analyzer 200 computes a different quality metric for each encoded shot sequence 220 included in selected encoded video sequence 180. At step 1306, shot analyzer 200 selects zero or more of the encoded shot sequences 220 included in selected encoded video sequence 180 based on the quality metrics. At step 1308, shot analyzer 200 determines whether any encoded shot sequences 220 are selected. If, at step 1308, shot analyzer 200 determines that one or more encoded shot sequences 220 are selected, then the method 1308 proceeds to step 1310.

At step 1310, for each selected encoded shot sequence 220, shot analyzer 200 re-encodes the associated shot sequence based on a resolution included in the set of resolutions that is different than the resolution associated with selected encoded shot sequence 220 to generate new encoded shot sequence 220. At step 1312, shot analyzer 200 generates a new encoded video sequence 180 based on new encoded shot sequences 220 and selected encoded video sequence 180. As part of step 1312, shot analyzer 200 ensures that key frames are inserted into new encoded video sequence 180 at the temporal locations associated with the set of key frame locations. At step 1314, shot analyzer 200 stores selected encoded video sequence 180 and selects new encoded video sequence 180. The method 1300 then returns to step 1304, where shot analyzer 200 computes new quality metrics.

If, however, at step 1308, shot analyzer 200 determines that none of the encoded shot sequences are selected, then the method 1308 proceeds directly to step 1316. At step 1316, shot analyzer 200 streams any portions of any number of the stored encoded video sequences 180 to any number of endpoint devices. The method 1300 then terminates.

In alternate embodiments, shot analyzer 200, encoding engine 180 and/or streaming application 730 may cause encoded video sequences 180 to be delivered to endpoint devices in any technically feasible fashion In the same or other embodiments, any amount and type of the functionality associated with shot analyzer 200, encoding engine 180 and streaming application 730 may be implemented in or distributed across any number of host computers 110, any number of cloud computers 140, any number of client computers (not shown), and any number of endpoint devices, in any technically feasible fashion.

For instance, in some embodiments, encoding engine 180 configures streaming application 730 to deliver metadata to client applications executing on endpoint devices. Metadata includes, without limitation, metrics associated with encoded video content at any level of granularity, such as bitrates and quality metrics associated with one or more encoded shot sequences and/or encoded video sequences 180. The client applications may perform any type and amount of adaptive streaming operations based on the metadata in any technically feasible fashion.

In one scenario, a user configures a video player application to stream a movie to a laptop. Streaming application 190 transmits the metadata associated with four different encoded video sequences 180(1-4) to the video player application. The metadata indicates that encoded video sequence 180(4) is associated with the highest bitrate and the highest visual quality, while encoded video sequence 180(1) is associated with the lowest bitrate and the lowest visual quality. At any given time, the video player application selects the encoded video sequence 180 that provides the highest available visual quality during playback of the movie while avoiding playback interruptions due to rebuffering.

Based on an initial available bandwidth and the metadata, the video player application configures streaming application 730 to begin streaming encoded video sequence 180(4) to the video player application. In this fashion, the video player application provides the highest available visual quality during playback of the movie. In general, because of internet traffic, especially during peak times during the day, connection conditions can change quickly and become quite variable. In the described scenario, after ten minutes of playback, the available bandwidth decreases dramatically. Based on the reduced bandwidth and the metatdata, the video player application configures streaming application 730 to dynamically switch between encoded video sequence 180(4) and encoded video sequence 180(1). At the next shot boundary, streaming application 730 begins streaming encoded video sequence 180(1) instead of encoded video sequence 180(4) to the video player application. Although the video player application is no longer able to provide the highest available visual quality during playback of the movie, the video player application successfully avoids playback interruptions due to rebuffering.

In sum, an encoding engine encodes a video sequence to provide optimal quality for a given bitrate. The encoding engine cuts the video sequence into a collection of shot sequences. Each shot sequence includes video frames captured from a particular capture point. The encoding engine resamples each shot sequence across a range of different resolutions, encodes each resampled sequence with a range of quality parameters, and then upsamples each encoded sequence to the original resolution of the video sequence. For each upsampled sequence, the encoding engine computes a quality metric and generates a data point that includes the quality metric and the resample resolution. The encoding engine collects all such data points and then computes the convex hull of the resultant data set. Based on all convex hulls across all shot sequences, the encoding engine determines an optimal collection of shot sequences for a range of bitrates.

At least one advantage of the techniques described herein is that the video sequence can be streamed to an end-user with the best available quality for a given bitrate. Conversely, for a given desired quality, the video sequence can be provided with the minimum possible bitrate.

1. In some embodiments, a computer-implemented method comprises generating a first encoded video sequence based on a first resolution and a source video sequence that is associated with a video title; determining a first encoded shot sequence from a plurality of encoded shot sequences included in the first encoded video sequence based on one or more quality metrics; generating a second encoded shot sequence based on a second resolution and a first shot sequence that is included in the source video sequence and associated with the first encoded shot sequence; and generating a second encoded video sequence based on the first encoded video sequence and the second encoded shot sequence, wherein at least a first portion of the second encoded video sequence is subsequently streamed to an endpoint device during playback of the video title.

2. The computer-implemented method of clause 1, wherein generating the second encoded video sequence comprises replacing the first encoded shot sequence included in the first encoded video sequence with the second encoded shot sequence.

3. The computer-implemented method of clauses 1 or 2, further comprising computing a video multimethod assessment fusion score or a harmonic video multimethod assessment fusion score based on the first encoded shot sequence to generate a first quality metric included in the one or more quality metrics.

4. The computer-implemented method of any of clauses 1-3, further comprising generating a frequency spectrum based on the first shot sequence; and determining an amount of energy within the frequency spectrum that has a value exceeding a threshold to generate a first quality metric included in the one or more quality metrics.

5. The computer-implemented method of any of clauses 1-4, wherein determining the first encoded shot sequence from the plurality of encoded shot sequences comprises performing one or more comparison operations between the one or more quality metrics to determine a first quality metric included in the one or more quality metrics having an associated value greater than the associated values of all other quality metrics included in the one or more quality metrics; and determining that the first quality metric corresponds to the first encoded shot sequence.

6. The computer-implemented method of any of clauses 1-5, wherein determining the first encoded shot sequence from the plurality of encoded shot sequences comprises determining that a first quality metric included in the one or more quality metrics has an associated value that is less than a minimum quality threshold; and determining that the first quality metric corresponds to the first encoded shot sequence.

7. The computer-implemented method of any of clauses 1-6, wherein, during playback, the video title is switchable between a decoded version of the first encoded video sequence and a decoded version of the second encoded video sequence via a first key frame included in the first encoded video sequence and a second key frame included in the second encoded video sequence.

8. The computer-implemented method of any of clauses 1-7, further comprising computing a first quality metric based on the first encoded video sequence; computing a second quality metric based on the second encoded video sequence; and determining to stream at least a second portion of the first encoded video sequence instead of a third portion of the second encoded video sequence to the endpoint device based on the first quality metric and the second quality metric.

9. The computer-implemented method of any of clauses 1-8, further comprising generating a third encoded shot sequence based on a third resolution and the first shot sequence; and generating a third encoded video sequence based on the second encoded video sequence and the third encoded shot sequence, wherein at least a second portion of the third encoded video sequence is subsequently streamed to the endpoint device during playback of the video title.

10. In some embodiments, a computer-readable storage medium includes instructions that, when executed by a processor, configure the processor to perform the steps of partitioning a source video sequence associated with a media title into a plurality of subsequences; generating a first encoded video sequence based on a first resolution and the plurality of subsequences; determining a first encoded subsequence from a plurality of encoded subsequences included in the first encoded video sequence based on one or more quality metrics; generating a second encoded subsequence based on a second resolution and a first subsequence that is included in the plurality of subsequences and associated with the first encoded subsequence; and generating a second encoded video sequence based on the first encoded video sequence and the second encoded subsequence, wherein at least a first portion of the second encoded video sequence is subsequently streamed to an endpoint device during playback of the video title.

11. The non-transitory computer-readable medium of clause 10, wherein generating the second encoded video sequence comprises replacing the first encoded subsequence included in the first encoded video sequence with the second encoded subsequence; and replacing a third encoded video sequence associated with a second subsequence included in the source video sequence with a fourth encoded subsequence associated with the second subsequence.

12. The non-transitory computer-readable medium of clauses 10 or 11, further comprising computing a video multimethod assessment fusion score or a harmonic video multimethod assessment fusion score based on the first encoded subsequence to generate a first quality metric included in the one or more quality metrics.

13. The non-transitory computer-readable medium of any of clauses 10-12, further comprising generating a frequency spectrum based on the first subsequence; and determining an amount of energy within the frequency spectrum that has a value exceeding a threshold to generate a first quality metric included in the one or more quality metrics.

14. The non-transitory computer-readable medium of any of clauses 10-13, wherein determining the first encoded subsequence from the plurality of encoded subsequences comprises performing one or more comparison operations between the one or more quality metrics to determine a first quality metric included in the one or more quality metrics having an associated value less than the associated values of all other quality metrics included in the one or more quality metrics; and determining that the first quality metric corresponds to the first encoded subsequence.

15. The non-transitory computer-readable medium of any of clauses 10-14, wherein determining the first encoded subsequence from the plurality of encoded subsequences comprises determining that a first quality metric included in the one or more quality metrics has an associated value that is greater than a maximum quality threshold; and determining that the first quality metric corresponds to the first encoded subsequence.

16. The non-transitory computer-readable medium of any of clauses 10-15, wherein, during playback, the video title is switchable between a decoded version of the first encoded video sequence and a decoded version of the second encoded video sequence via a first key frame included in the first encoded video sequence and a second key frame included in the second encoded video sequence.

17. The non-transitory computer-readable medium of any of clauses 10-16, further comprising computing a first quality metric based on the first encoded video sequence; computing a second quality metric based on the second encoded video sequence; and determining to stream at least a second portion of the first encoded video sequence instead of a third portion of the second encoded video sequence to the endpoint device based on the first quality metric and the second quality metric.

18. The non-transitory computer-readable medium of any of clauses 10-17, further comprising generating a third encoded subsequence based on a third resolution and the first subsequence; and generating a third encoded video sequence based on the second encoded video sequence and the third encoded subsequence, wherein at least a second portion of the third encoded video sequence is subsequently streamed to the endpoint device during playback of the video title.

19. In some embodiments, a system comprises a memory storing instructions; and a processor that is coupled to the memory and, when executing the instructions, is configured to generate a first encoded video sequence based on a first resolution and a source video sequence that is associated with a video title; determine a first encoded subsequence from a plurality of subsequences included in the first encoded video sequence based on one or more quality metrics; generate a second encoded subsequence based on a second resolution and a first subsequence that is included in the source video sequence and associated with the first encoded subsequence; and generate a second encoded video sequence based on the first encoded video sequence and the second encoded subsequence, wherein at least a first portion of the second encoded video sequence is subsequently streamed to an endpoint device during playback of the video title.

20. The system of clause 19, where in the processor is further configured to compute a video multimethod assessment fusion score or a harmonic video multimethod assessment fusion score based on the first encoded subsequence to generate a first quality metric included in the one or more quality metrics.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
generating a first encoded video sequence based on a first resolution and a source video sequence that is associated with a video title;
dividing the first encoded video sequence into a plurality of different encoded shot sequences;
determining that one or more quality metrics associated with a first encoded shot sequence included in the plurality of different encoded shot sequences have at least one of a highest value or a lowest value when compared with one or more quality metrics associated with the other encoded shot sequences included in the plurality of different encoded shot sequences, wherein at least one quality metric included in the one or more quality metrics associated with the first encoded shot sequence is generated by at least one of:
  computing a video multimethod assessment fusion score or a harmonic video multimethod assessment fusion score based on the first encoded shot sequence, or
  generating a frequency spectrum based on the first encoded shot sequence and determining an amount of energy within the frequency spectrum that has a value exceeding a threshold;
in response, determining that the first encoded shot sequence should be re-encoded at a different resolution;
generating a second encoded shot sequence based on a second resolution and a first shot sequence that is included in the source video sequence and associated with the first encoded shot sequence; and
generating a second encoded video sequence based on the first encoded video sequence and the second encoded shot sequence, wherein at least a first portion of the second encoded video sequence is subsequently streamed to an endpoint device during playback of the video title.

2. The computer-implemented method of claim 1, wherein generating the second encoded video sequence comprises replacing the first encoded shot sequence included in the first encoded video sequence with the second encoded shot sequence.

3. The computer-implemented method of claim 1, wherein determining that the one or more quality metrics associated with the first encoded shot sequence have at least one of a highest value or a lowest value when compared with the one or more quality metrics associated with the other encoded shot sequences comprises performing one or more comparison operations between the one or more quality metrics associated with the first encoded shot sequence and the one or more quality metrics associated with the other encoded shot sequences to determine a first quality metric included in the one or more quality metrics associated with the first encoded shot sequence having an associated value greater than associated values of all other corresponding quality metrics included in the one or more quality metrics associated with the other encoded shot sequences.

4. The computer-implemented method of claim 1, wherein determining that the one or more quality metrics associated with the first encoded shot sequence have at least one of a highest value or a lowest value when compared with the one or more quality metrics associated with the other encoded shot sequences comprises determining that a first quality metric included in the one or more quality metrics associated with the first encoded shot sequence has an associated value that is less than associated values of all other corresponding quality metrics included in the one or more quality metrics associated with the other encoded shot sequences.

5. The computer-implemented method of claim 1, wherein, during playback, the video title is switchable between a decoded version of the first encoded video sequence and a decoded version of the second encoded video sequence via a first key frame included in the first encoded video sequence and a second key frame included in the second encoded video sequence.

6. The computer-implemented method of claim 1, further comprising:
computing a first quality metric based on the first encoded video sequence;
computing a second quality metric based on the second encoded video sequence; and
determining to stream at least a second portion of the first encoded video sequence instead of a third portion of the second encoded video sequence to the endpoint device based on the first quality metric and the second quality metric.

7. The computer-implemented method of claim 1, further comprising:
generating a third encoded shot sequence based on a third resolution and the first shot sequence; and
generating a third encoded video sequence based on the second encoded video sequence and the third encoded shot sequence, wherein at least a second portion of the third encoded video sequence is subsequently streamed to the endpoint device during playback of the video title.

8. One or more non-transitory computer-readable media storing program instructions that, when executed by one or more processors, configures the one or more processors to perform the steps of:
generating a first encoded video sequence based on a first resolution and a source video sequence that is associated with a video title;
dividing the first encoded video sequence into a plurality of different encoded subsequences;
determining that one or more quality metrics associated with a first encoded subsequence included in the plurality of different encoded subsequences have at least one of a highest value or a lowest value when compared with one or more quality metrics associated with the other encoded subsequences included in the plurality of different encoded subsequences, wherein at least one quality metric included in the one or more quality metrics associated with the first encoded subsequence is generated by at least one of:
computing a video multimethod assessment fusion score or a harmonic video multimethod assessment fusion score based on the first encoded subsequence, or
generating a frequency spectrum based on the first encoded subsequence and determining an amount of energy within the frequency spectrum that has a value exceeding a threshold;
in response, determining that the first encoded subsequence should be re-encoded at a different resolution;
generating a second encoded subsequence based on a second resolution and a first subsequence that is included in the source video sequence and associated with the first encoded subsequence; and
generating a second encoded video sequence based on the first encoded video sequence and the second encoded subsequence, wherein at least a first portion of the second encoded video sequence is subsequently streamed to an endpoint device during playback of the video title.

9. The one or more non-transitory computer-readable media of claim 8, wherein generating the second encoded video sequence comprises:
replacing the first encoded subsequence included in the first encoded video sequence with the second encoded subsequence; and
replacing a third encoded subsequence associated with a second subsequence included in the source video sequence with a fourth encoded subsequence associated with the second subsequence.

10. The one or more non-transitory computer-readable media of claim 8, wherein determining that the one or more quality metrics associated with the first encoded subsequence have at least one of a highest value or a lowest value when compared with the one or more quality metrics associated with the other encoded subsequences comprises performing one or more comparison operations between the one or more quality metrics associated with the first encoded subsequence and the one or more quality metrics associated with the other encoded subsequences to determine a first quality metric included in the one or more quality metrics associated with the first encoded subsequence having an associated value greater than associated values of all other corresponding quality metrics included in the one or more quality metrics associated with the other encoded subsequences.

11. The one or more non-transitory computer-readable media of claim 8, wherein determining that the one or more quality metrics associated with the first encoded subsequence have at least one of a highest value or a lowest value when compared with the one or more quality metrics associated with the other encoded subsequences comprises determining that a first quality metric included in the one or more quality metrics associated with the first encoded subsequence has an associated value that is less than associated values of all other corresponding quality metrics included in the one or more quality metrics associated with the other encoded subsequences.

12. The one or more non-transitory computer-readable media of claim 8, wherein, during playback, the video title is switchable between a decoded version of the first encoded video sequence and a decoded version of the second encoded video sequence via a first key frame included in the first encoded video sequence and a second key frame included in the second encoded video sequence.

13. The one or more non-transitory computer-readable media of claim 8, the steps further comprising:
    computing a first quality metric based on the first encoded video sequence;
    computing a second quality metric based on the second encoded video sequence; and
    determining to stream at least a second portion of the first encoded video sequence instead of a third portion of the second encoded video sequence to the endpoint device based on the first quality metric and the second quality metric.

14. The one or more non-transitory computer-readable media of claim 8, the steps further comprising:
    generating a third encoded subsequence based on a third resolution and the first subsequence; and
    generating a third encoded video sequence based on the second encoded video sequence and the third encoded subsequence, wherein at least a second portion of the third encoded video sequence is subsequently streamed to the endpoint device during playback of the video title.

15. A system, comprising:
    one or more memories storing instructions; and
    one or more processors that are coupled to the one or more memories and, when executing the instructions, are configured to:
        generate a first encoded video sequence based on a first resolution and a source video sequence that is associated with a video title,
        divide the first encoded video sequence into a plurality of different encoded subsequences,
        determine that one or more quality metrics associated with a first encoded subsequence included in the plurality of different encoded subsequences have at least one of a highest value or a lowest value when compared with one or more quality metrics associated with the other encoded subsequences included in the plurality of different encoded subsequences, wherein at least one quality metric included in the one or more quality metrics associated with the first encoded subsequence is generated by at least one of:
            computing a video multimethod assessment fusion score or a harmonic video multimethod assessment fusion score based on the first encoded subsequence, or
            generating a frequency spectrum based on the first encoded subsequence and determining an amount of energy within the frequency spectrum that has a value exceeding a threshold,
        in response, determine that the first encoded subsequence should be re-encoded at a different resolution,
        generate a second encoded subsequence based on a second resolution and a first subsequence that is included in the source video sequence and associated with the first encoded subsequence, and
        generate a second encoded video sequence based on the first encoded video sequence and the second encoded subsequence, wherein at least a first portion of the second encoded video sequence is subsequently streamed to an endpoint device during playback of the video title.

* * * * *

UNITED STATES PATENT AND TRADEMARK OFFICE
CERTIFICATE OF CORRECTION

Page 1 of 1

PATENT NO. : 12,255,940 B2
APPLICATION NO. : 16/053754
DATED : March 18, 2025
INVENTOR(S) : Ioannis Katsavounidis It is certified that error appears in the above-identified patent and that said Letters Patent is hereby corrected as shown below:

On the Title Page

Item (56), page 3, OTHER PUBLICATION Please delete "Buehring, Karsten, "H.264/AVC software", http://iphone.hhi.de/suehring/tml/, retrieved May 17, 2020, 1 page." and insert --Suehring, Karsten, "H.264/AVC software", http://iphone.hhi.de/suehring/tml/, retrieved May 17, 2020, 1 page.--.

Signed and Sealed this
Sixth Day of May, 2025

Coke Morgan Stewart
*Acting Director of the United States Patent and Trademark Office*